(12) United States Patent
Lee et al.

(10) Patent No.: US 11,256,365 B2
(45) Date of Patent: Feb. 22, 2022

(54) TOUCH CONTROLLER, TOUCH SENSING DEVICE, AND TOUCH SENSING METHOD

(71) Applicant: SAMSUNG ELECTRONICS CO., LTD., Suwon-si (KR)

(72) Inventors: Kyeong-Gon Lee, Hwaseong-si (KR); Bum-Soo Kim, Seoul (KR); Sang-Uk Woo, Seongnam-si (KR); Yoon-Kyung Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/357,456

(22) Filed: Mar. 19, 2019

(65) Prior Publication Data

US 2019/0294310 A1    Sep. 26, 2019

(30) Foreign Application Priority Data

Mar. 26, 2018 (KR) .................... 10-2018-0034759

(51) Int. Cl.
*G06F 3/041* (2006.01)
*G09G 3/20* (2006.01)

(52) U.S. Cl.
CPC .... *G06F 3/04184* (2019.05); *G06F 3/041662* (2019.05); *G09G 3/2088* (2013.01); *G09G 2310/0264* (2013.01)

(58) Field of Classification Search
CPC .... G06F 3/044; H03K 17/962; H03K 17/955; H03K 17/9645; G01D 5/24
See application file for complete search history.

(56) References Cited

U.S. PATENT DOCUMENTS

| | | | |
|---|---|---|---|
| 9,245,490 B1 | 1/2016 | Cho et al. | |
| 9,786,254 B2 | 10/2017 | Reynolds et al. | |
| 10,180,760 B2* | 1/2019 | Liu | G06F 3/04184 |
| 2010/0110040 A1* | 5/2010 | Kim | G06F 3/0418 345/174 |
| 2011/0210941 A1 | 9/2011 | Reynolds et al. | |
| 2011/0234523 A1* | 9/2011 | Chang | G06F 3/0446 345/173 |

(Continued)

FOREIGN PATENT DOCUMENTS

KR    10-2017-0051781    5/2017

OTHER PUBLICATIONS

European Office Action dated Oct. 21, 2021 Cited in EP Patent Application No. 19161955.0.

*Primary Examiner* — William Lu
(74) *Attorney, Agent, or Firm* — Volentine, Whitt & Francos, PLLC

(57) ABSTRACT

A touch controller includes a controller receiving a display timing signal and generating a touch sensing control signal synchronously with the display timing signal. The touch controller also includes a sensing circuit driving a touch sensing array in response to the touch sensing control signal in order to generate touch data corresponding to sensing signals provided by the touch sensing array. The sensing circuit provides a first driving signal having a first polarity to at least one driving channel of the touch sensing array during a first display frame period, and provides a second driving signal having a second polarity different from the first polarity during a second display frame period.

20 Claims, 26 Drawing Sheets

(56) References Cited

U.S. PATENT DOCUMENTS

| | | | |
|---|---|---|---|
| 2011/0267293 A1* | 11/2011 | Noguchi | G06F 3/0416 345/173 |
| 2011/0267305 A1* | 11/2011 | Shahparnia | G06F 3/0412 345/174 |
| 2012/0044180 A1* | 2/2012 | Matsui | G06F 3/044 345/173 |
| 2012/0169660 A1 | 7/2012 | Seo | |
| 2013/0093720 A1* | 4/2013 | Liu | G06F 3/04184 345/174 |
| 2013/0127779 A1* | 5/2013 | Lillie | G06F 3/0416 345/174 |
| 2013/0176272 A1 | 7/2013 | Cattivelli et al. | |
| 2014/0145997 A1* | 5/2014 | Tiruvuru | G06F 3/04182 345/174 |
| 2015/0002444 A1* | 1/2015 | Brunet | G06F 3/0416 345/174 |
| 2015/0145819 A1* | 5/2015 | Bae | G02F 1/13338 345/174 |
| 2015/0185913 A1 | 7/2015 | Han et al. | |
| 2015/0346860 A1* | 12/2015 | Qin | G09G 3/3655 345/174 |
| 2016/0202829 A1* | 7/2016 | Choi | G06F 3/04184 345/174 |
| 2016/0209950 A1* | 7/2016 | Kim | G06F 3/044 |
| 2016/0328076 A1 | 11/2016 | Pan | |
| 2016/0342276 A1* | 11/2016 | Lu | G02F 1/13624 |
| 2017/0018219 A1 | 1/2017 | Wang et al. | |
| 2017/0090630 A1 | 3/2017 | Kim et al. | |
| 2017/0090668 A1 | 3/2017 | Agarwal et al. | |
| 2017/0123535 A1* | 5/2017 | Takeuchi | G02F 1/13338 |
| 2017/0185218 A1 | 6/2017 | Lee et al. | |
| 2017/0308212 A1* | 10/2017 | Jin | G06F 3/0445 |
| 2018/0053461 A1* | 2/2018 | Tien | G09G 3/2003 |
| 2018/0095576 A1* | 4/2018 | Yokoo | G09G 3/3648 |
| 2019/0073085 A1* | 3/2019 | Zhang | G06F 3/0412 |
| 2019/0129534 A1* | 5/2019 | Chiang | G06F 3/0445 |
| 2019/0294310 A1* | 9/2019 | Lee | G06F 3/041662 |
| 2020/0081573 A1* | 3/2020 | Kim | G06F 3/0412 |

* cited by examiner

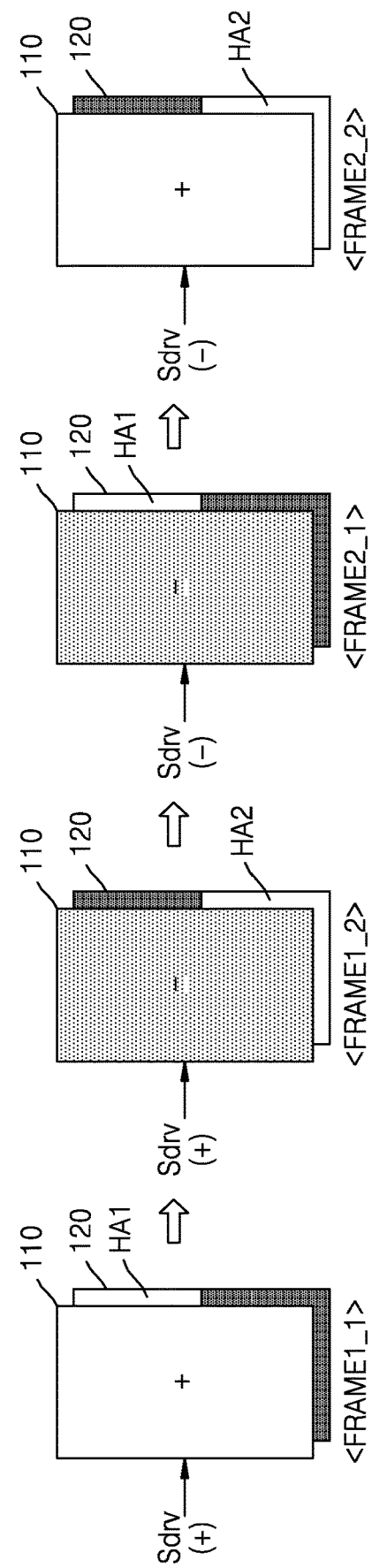

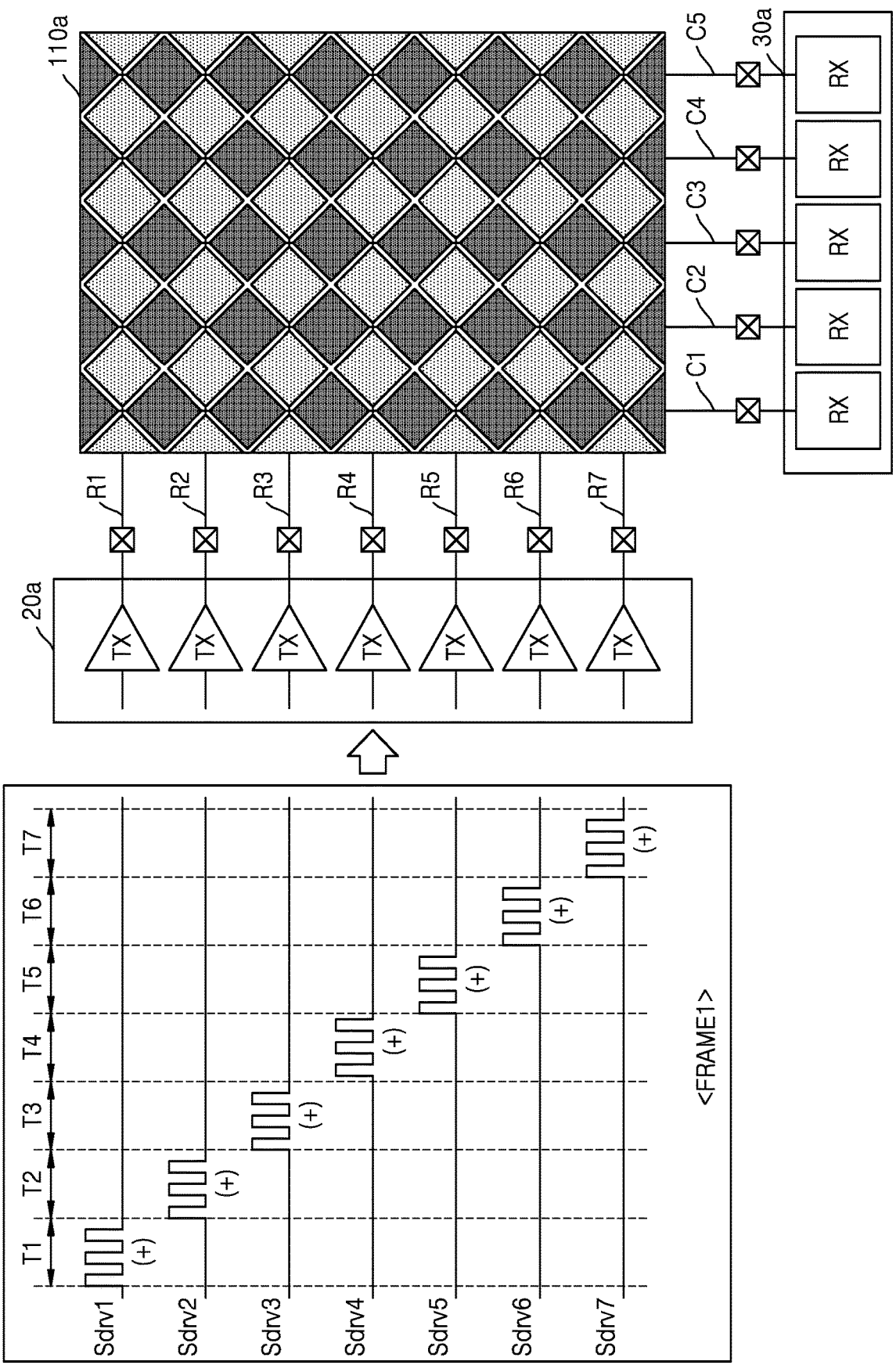

<FRAME1>

<FRAME2>

<FRAME1>

<FRAME2>

TOUCH CONTROLLER, TOUCH SENSING DEVICE, AND TOUCH SENSING METHOD

CROSS-REFERENCE TO RELATED APPLICATION

This application claims the benefit of Korean Patent Application No. 10-2018-0034759 filed on Mar. 26, 2018, the disclosure of which is hereby incorporated entirety by reference.

BACKGROUND

The inventive concept relates to touch sensing devices, and more particularly, to touch controllers operating in synchronization with a display timing signal. The inventive concept also relates to touch sensing devices including this type of touch controller associated touch sensing methods of operation.

Touch sensing devices are input devices enabling a user to create an input using a finger or an object (e.g., a touch pen). The input is positional applied in relation to content displayed on a screen of a display apparatus. Conventionally recognized examples of touch sensing methods that may be used in conjunction with a touch sensing devices include; resistance-based methods, light sensing methods, and capacitance-based methods.

Among other types of touch sensing methods, certain capacitance methods convert a touch input into corresponding electrical signal(s) in response to the capacitance generated by a conductive electrode of a touch sensing device being brought into proximity with a user's finger or touch pen. Touch sensing devices are routinely associated with a front surface including a display. Accordingly, touch sensing sensitivity may be reduced by noise arising from operation of the display. In order to prevent touch sensing sensitivity from being reduced in this manner, touch sensing devices may perform touch sensing in synchronization with a display timing signal.

SUMMARY

The inventive concept provides a touch controller, a touch sensing device, and a touch sensing method, which perform touch sensing in synchronization with a display timing signal and prevent the quality of a displayed image from being degraded when performing a touch.

According to an aspect of the inventive concept, there is provided a touch controller including; a controller configured to receive a display timing signal and generate a touch sensing control signal synchronously with the display timing signal, and a sensing circuit configured to drive a touch sensing array in response to the touch sensing control signal in order to generate touch data corresponding to sensing signals provided by the touch sensing array. The sensing circuit provides a first driving signal having a first polarity to at least one driving channel of the touch sensing array during a first display frame period, and provides a second driving signal having a second polarity different from the first polarity during a second display frame period.

According to another aspect of the inventive concept, there is provided a touch sensing device including; a touch sensing array stacked on a display panel and including a plurality of electrodes configured to sense a touch input, and a touch controller configured to generate a polarity-changeable driving signal in response to a display timing signal received from a display driving circuit and provide the polarity-changeable driving signal to the plurality of electrodes.

According to another aspect of the inventive concept, there is provided a touch sensing method for sensing a touch input applied to a touch sensing array of a display panel. The touch sensing method includes; using a touch controller to drive the touch sensing array to perform sensing in response to a first driving signal having a first polarity during a first display frame period synchronously with a timing signal received from a display driving circuit, and using the touch controller to drive the touch sensing array to perform sensing in response to a second driving signal having a second polarity, opposite to the first polarity, during a second display frame period synchronously with the timing signal.

BRIEF DESCRIPTION OF THE DRAWINGS

Embodiments of the inventive concept will be more clearly understood from the following detailed description taken in conjunction with the accompanying drawings in which:

FIG. 8B is a diagram illustrating a touch screen in relation to the touch sensing method of FIG. 8A;

FIGS. 13A and 13B are diagrams further illustrating the mutual capacitance sensing mode;

DETAILED DESCRIPTION

Figure 1:
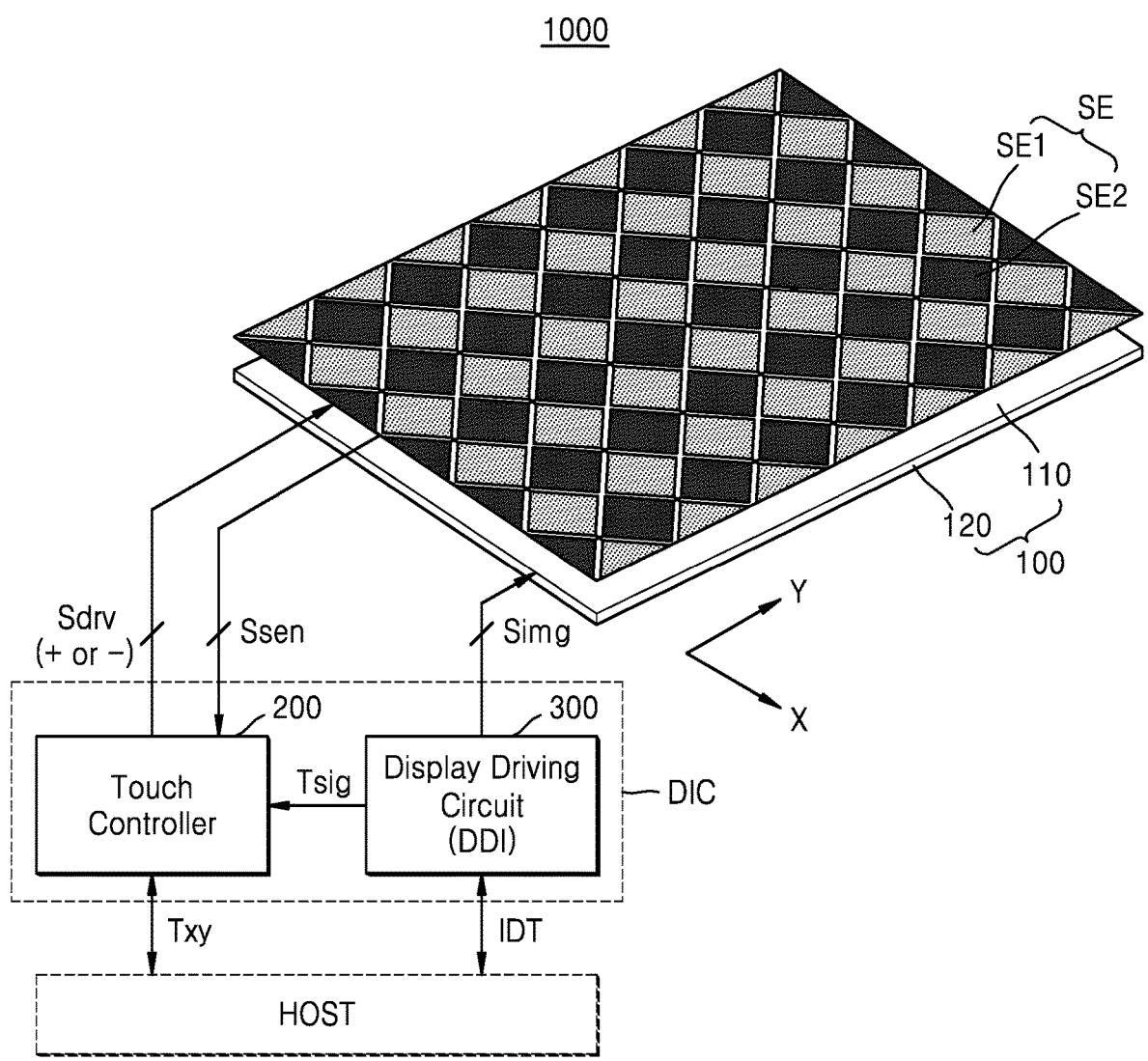
FIG. 1 is a diagram illustrating a touch screen device.

Figure (FIG. 1 is a perspective view illustrating in one example a touch screen device 1000. The touch screen device 1000 may be provided in a variety of electronic devices including as examples; smartphones, laptop computers, mobile phones, tablet personal computers (PCs), enterprise digital assistants (EDAs), digital still cameras, digital video cameras, portable multimedia players (PMPs), handheld game consoles, wearable computers, internet of things (IoT) devices, internet of everything (IoE) devices, drones and e-books. That is, the touch screen device 1000 may be variously provided in electronic devices capable of sensing a touch input and performing one or more operation(s) in response to the touch input.

Referring to FIG. 1, the touch screen device 1000 may include a touch screen 100, a touch controller 200, and a display driving integrated circuit (IC) ("DDI") 300. The touch controller 200 and DDI 300 may in certain embodiments be commonly configured as a driving IC ("DIC") driving the touch screen device 1000. However, the touch controller 200 and DDI 300 may be provided in the same semiconductor chip or different semiconductor chips.

The touch screen 100 may be used to display an image and may receive a touch input from a user positioned on the touch screen in response to displayed content associated with the image. In this regard, the touch screen 100 may operate as an input/output (I/O) device for the electronic device. The touch input may reasonably include any input from a conductive object (e.g., a finger, multiple fingers, or palm of a user's hand, a writing implement, a touch pen or stylus, etc.) placed in direct contact with and/or within proximity of a surface of the touch screen 100. Hereinafter, a conductive object enabling a user to apply a touch input to the touch screen 100 will be referred to an "object".

The touch screen 100 may include a display panel 120 and a touch sensing array 110, where the touch sensing array 110 may be stacked (or layered) on the display panel 120.

The display panel 120 may be used to display an image in response to various image signals (singularly or collectively, "Simg") provided by the DDI 300. The display panel 120 may include a plurality of pixels ("pixels") arranged in a matrix, where certain image signals Simg are applied to the pixels in row units and/or column units. For example, the image signals Simg may be applied to the pixels in a sequential order extending from a first row to a last row. In this context, completion of a resulting image or image portion may be referred to as a frame, and the rate at which the image is updated on the display panel 120 may be referred to as a frame rate.

The display panel 120 may be variously implemented using, for example, a liquid crystal display (LCD), a light emitting diode (LED) display, an organic light emitting diode (OLED) display, an active-matrix OLED (AMOLED) display, an electrochromic display (ECD), a digital mirror device (DMD), an actuated mirror device (AMD), a grating light value (GLV) display, a plasma display panel (PDP), an electroluminescent display (ELD), and a vacuum fluorescent display (VFD), or another kind of flat panel or a flexible panel.

The touch sensing array 110 may be used to generate one or more sensing signal(s) (singularly or collectively, "Ssen") corresponding to a touch input. In certain embodiments, the touch sensing array 110 may generate the sensing signal Ssen in response to a driving signal ("Sdrv") received from the touch controller 200. Here, the driving signal Sdry may be a voltage signal, and the sensing signal Ssen may be a current signal.

The touch sensing array 110 may include a plurality of sensing electrodes ("sensing electrodes SE") for sensing the touch input, where the sensing electrodes SE are arranged in a matrix extending in arbitrarily designated first (X-axis) and second (Y-axis) directions. For example, the first direction may be substantially vertical to the horizontally disposed second direction. In this regard, a plurality of first sensing electrodes SE1 arranged in the first direction may be configured to operate as first (or "row") channels, and a plurality of second sensing electrodes SE2 arranged in the second direction may be configured to operate as second (or "column") channels. However, the sensing electrodes SE may in certain embodiments be capacitive touch sensors, such as capacitive touch sensors including a transparent conductive material such as indium tin oxide (ITO), indium zinc oxide (IZO), or indium zinc tin oxide (IZTO).

In certain embodiments, the touch sensing array 110 may be implemented as one body with the display panel 120. For example, the touch sensing array 110 may be provided inside the display panel 120, and each of the sensing electrodes SE may be implemented as at least one of various kinds of electrodes included in the display panel 120. For example, the display panel 120 may include the various kinds of electrodes such as a common electrode, a gate line electrode, and a data line electrode, and the touch sensing array 110 may include, as a sensing electrode SE, at least one of the various kinds of electrodes. For example, the common electrode may be used as a sensing electrode SE of the touch sensing array 110.

The DDI 300 may be used to convert image data ("IDT") provided from a host HOST (e.g., an application processor) into the corresponding image signals Simg provided to the display panel 120 to thereby enable the display panel 120 to display an image.

The DDI 300 may further provide the touch controller 200 with a display timing signal ("Tsig") used to drive the display panel 120. For example, the display timing signal Tsig may include a vertical synchronization signal and/or a horizontal synchronization signal, where the vertical synchronization signal indicates a display frame period ("frame period") for an image displayed by the display panel 120 and the horizontal synchronization signal indicates a horizontal driving period during which the image signals Simg are applied to the pixels of the display panel 120 according to row units.

The touch controller 200 may perform touch sensing to determine the occurrence or non-occurrence of the touch input as well as the position of the touch input relative to the touch screen 100 and/or contents displayed on the touch screen 100. That is, the touch controller 200 may provide the driving signal Sdry to the touch sensing array 110 and receive sensing signal(s) Ssen generated in response to the driving signal Sdry by the touch sensing array 110. The touch controller 200 may determine the occurrence or non-occurrence of a touch input in response to the sensing signal(s) Ssen, and calculate a position (e.g., touch coordinates "Txy") associated with the touch input. The touch controller 200 may provide the touch coordinates Txy to the host.

In certain embodiments, the touch screen 100 may further include a force sensing electrode configured to sense a force with which the touch input is applied to the touch screen 100. In such embodiments, the touch controller 200 may be used to drive the touch sensing array 110 and the force sensing electrode to perform touch force sensing, calculate a touch force, and provide the calculated touch force to the host.

In certain embodiments, the touch controller 200 may perform touch sensing synchronously with the display timing signal Tsig provided by the DDI 300. For example, the touch controller 200 may perform touch sensing synchronously with the display timing signal Tsig during time period(s) characterized by low or no display noise. Additionally or alternatively, the touch controller 200 may change the polarity of the driving signal Sdry when the display fame changes. For example, the touch controller 200 may provide a first driving signal Sdry having a first polarity (+) to the touch sensing array 110 during a first set of display frame period(s), and a second driving signal Sdry having a second polarity (−) to the touch sensing array 110 during a second set of display frame period(s) different from the first set of display frame period(s). In this regard, each one of the first set of display frame periods and the second set of display frame period(s) may include any reasonable number of more display frame(s) greater than zero. Further, the number of display frames included in the first set of display frame periods may be the same as or different from a number of display frames included in the second set of display frame periods. Thus, in certain embodiments, the touch controller 200 may change the polarity of the driving signal Sdry whenever the display frame has changed N times, where 'N' is a positive integer.

As described above, the touch sensing array 110 may be stacked on the display panel 120 or provided as one body with the display panel 120. Thus, a parasitic capacitor may be formed between the display panel 120 and a sensing electrode SE of the touch sensing array 110. Due to the parasitic capacitor, the display noise occurring when the image signals Simg are applied to the display panel 120 may affect the touch sensing array 110, thereby causing a reduction in touch sensing sensitivity. However, the touch controller 200 according to certain embodiments may perform touch sensing synchronously with the display timing signal Tsig during a period in which the display noise is relatively less.

In a case where a driving signal Sdry having the same polarity is applied to the touch sensing array 110 during each display frame, pixels of certain row(s) within the display panel 120 may be adversely affected by the fixed-polarity driving signal Sdrv. As a result, image quality may degraded due to (e.g.) flicker noise in the form of visible horizontal stripes across the image. However, the touch controller 200 described above provides a driving signal Sdry changing (or alternating) its polarity with a change in the display frame or with a change of first and second display frame sets, thereby preventing such degradation in image quality. In this manner, the touch screen device 1000 of FIG. 1 enhances touch sensing sensitivity without degradation in image quality.

Figure 2A:
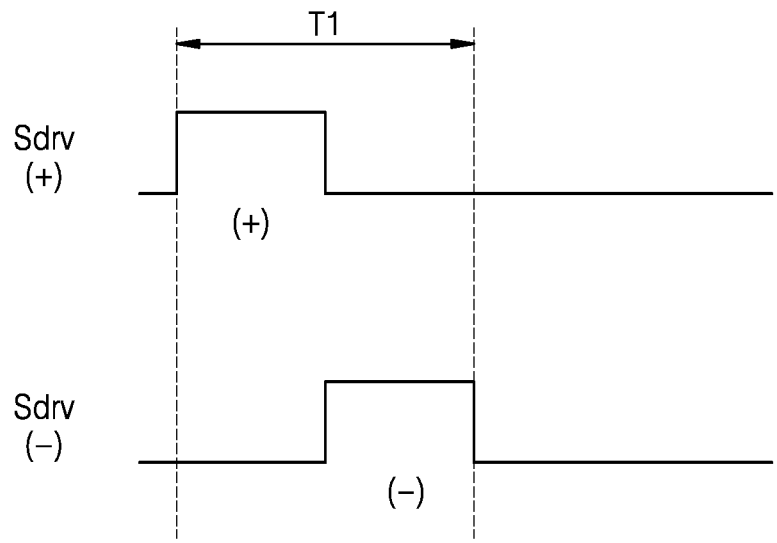
FIGS. 2A and 2B are diagrams further illustrating in one example the driving signal.
Figure 2B:
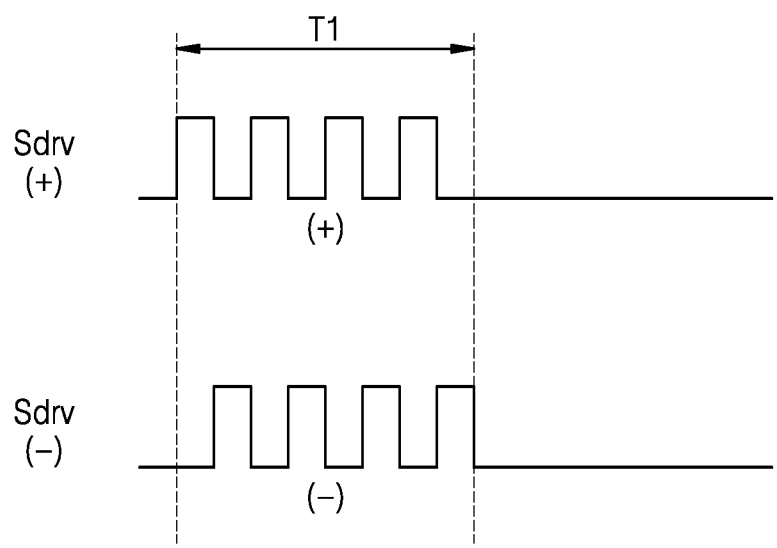

FIGS. 2A and 2B are signal waveform diagrams illustrating in one example implementation of the driving signal Sdry of FIG. 1.

Referring to FIG. 2A, the driving signal Sdry may have a pulse shape varying between a first polarity (+) and second polarity (−), where the first polarity (+) and the second polarity (−) have distinct phases differing by 180 degrees over an arbitrarily defined time period T1.

Referring to FIG. 2B, the pulse frequency of the driving signal Sdry having either the first polarity (+) or the second polarity (−) may be varied over the time period T1. Hence, the period of a driving signal Sdry having the first polarity (+) and the period of a driving signal having the second polarity (−) may be the same, while their respective phases differ by 180 degrees, for example.

The examples illustrated in FIGS. 2A and 2B assume a square wave, but those skilled in the art will recognize that other signal waveform may be used, such as triangular or sinusoidal waveforms.

Figure 3A:
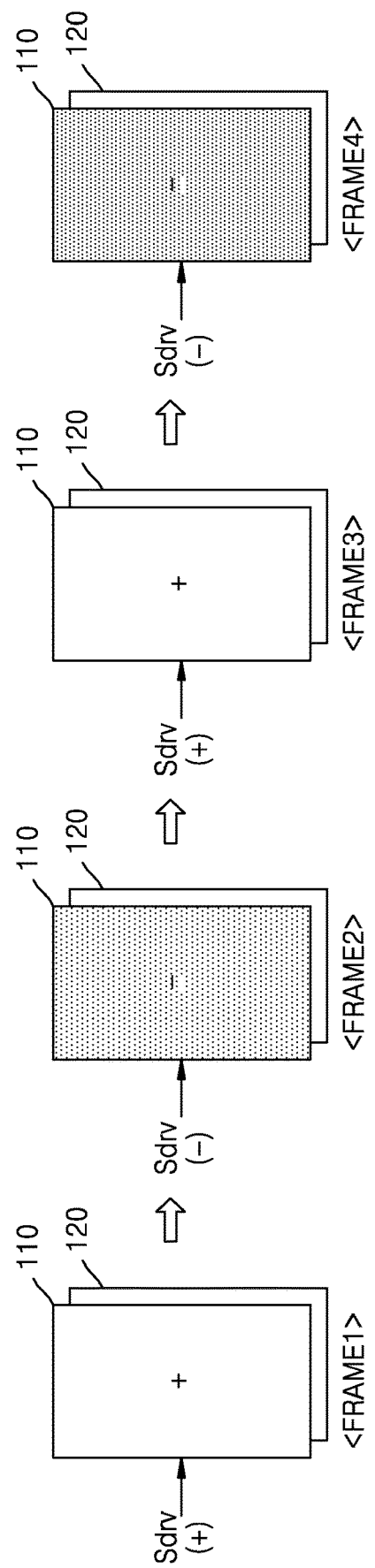
FIGS. 3A and 3B are diagrams illustrating a touch sensing method.
Figure 3B:
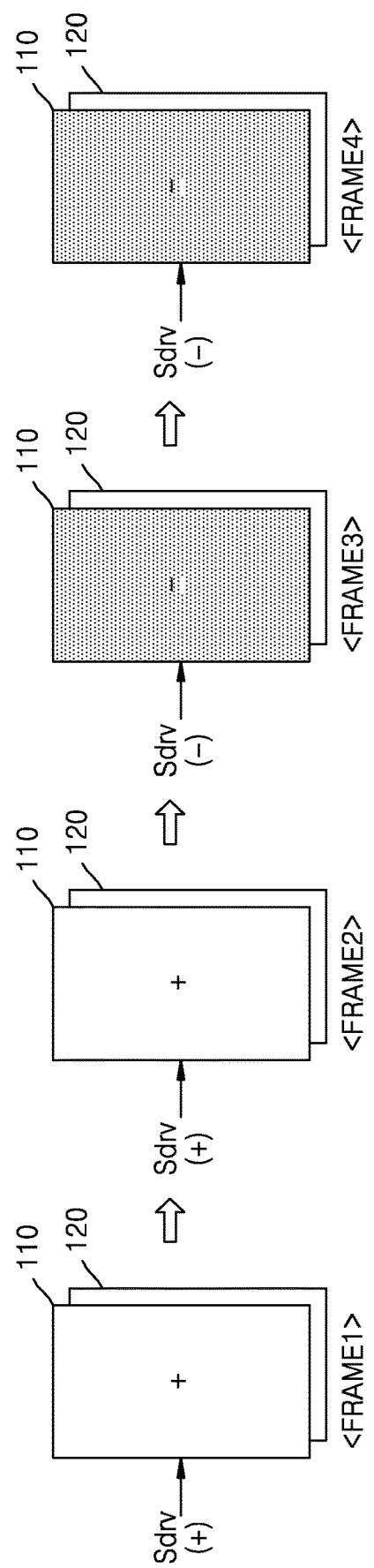

FIGS. 3A and 3B are conceptual diagrams further illustrating a touch sensing method that may be used with the touch screen device 1000 of FIG. 1.

Referring to FIG. 3A, during a first frame period FRAME1 (i.e., when an image corresponding to a first frame is displayed by the display panel 120), the driving signal Sdry having the first polarity (+) is applied to the touch sensing array 110. During a second frame period FRAME2, the driving signal Sdry having the second polarity (−) is applied to the touch sensing array 110. During a third frame period FRAME3, the driving signal Sdry having the first polarity (+) is applied to the touch sensing array 110, and during a fourth frame period FRAME4, the driving signal Sdry having the second polarity (−) is applied to the touch sensing array 110. Thus, in the illustrated example of FIG. 3A, the polarity of the driving signal Sdry is changed (or toggle) between first and second polarities with each alternating frame period (e.g., N=1).

However referring now to FIG. 3B, during successive first and second frame periods FRAME1 and FRAME2, the driving signal Sdry having the first polarity (+) is applied to the touch sensing array 110, while during successive third and fourth frame periods FRAME3 and FRAME4, the driving signal Sdry having the second polarity (−) is applied to the touch sensing array 110. Thus, in the illustrated example of FIG. 3B, the polarity of the driving signal Sdry is changed (or toggled) with each succeeding set of two frame periods (e.g., N=2).

From the examples illustrated in FIGS. 3A and 3B, those skilled in the art will recognize that any reasonable number ('N') of frame periods may be used to define a change in frequency for the polarity of the driving signal Sdrv. Further, the application of the driving signal Sdry need not be limited to only an equal number of frame periods for each respective polarity. Still further, a choice between possible polarities for the driving signal Sdry need not be limited to only (+) and (−) polarities.

Hence, the polarity of the driving signal Sdry applied to the touch sensing array 110 is changed with alternating frame periods, or with alternating sets of frame periods so that application of the driving signal Sdry does not adversely affect the display panel 120, and particularly certain regions of the display panel 120 vulnerable to degradations in image quality. In this manner, problems conventionally associated with maintaining image quality across the entire display panel 120 during periodic application of the driving signal Sdry may be resolved.

Figure 4:
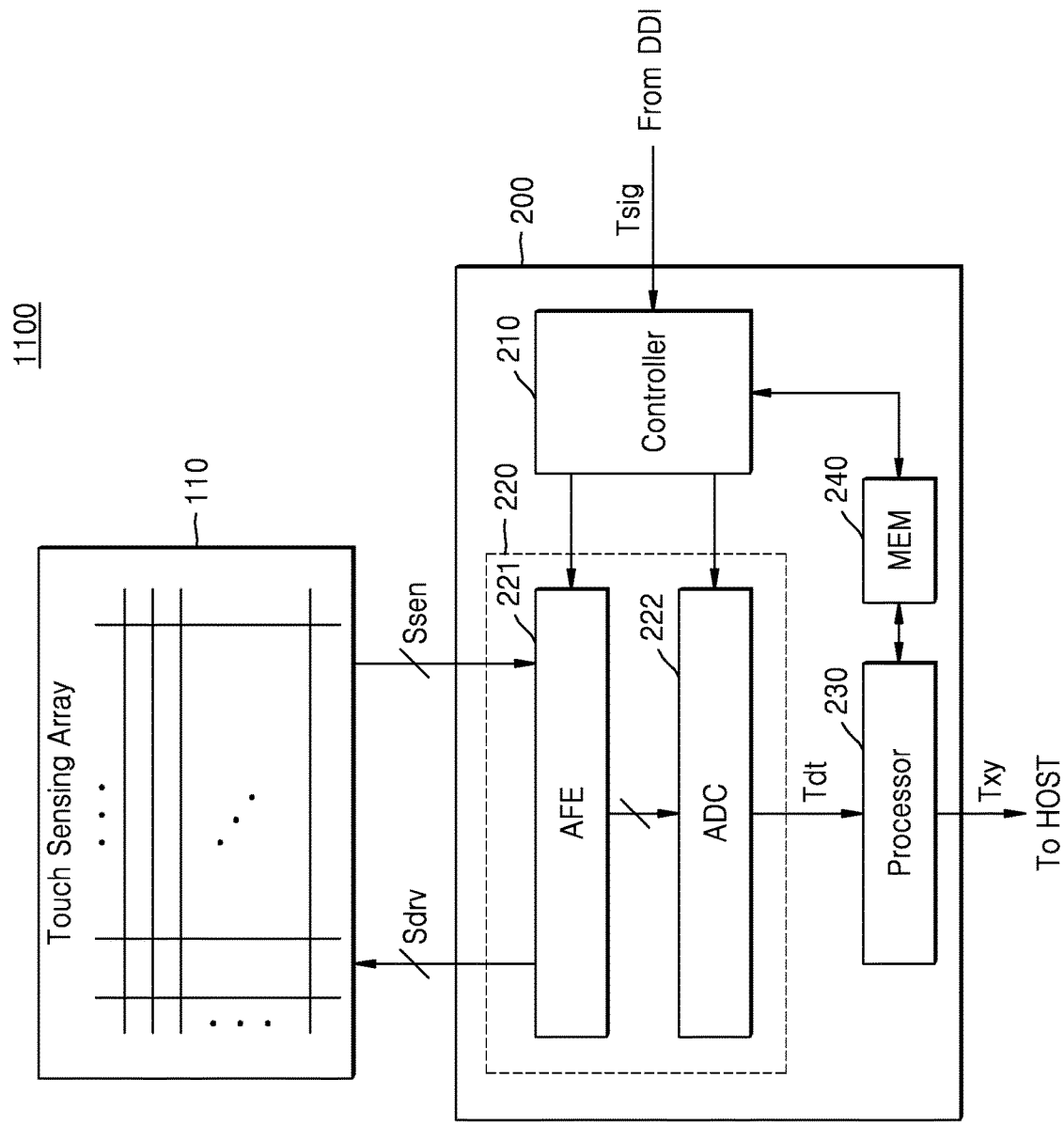
FIG. 4 is a block diagram illustrating a touch sensing device.

FIG. 4 is a block diagram illustrating a touch sensing device 1100 including a touch sensing array 110 and a touch controller 200.

As described with reference to FIG. 1, the touch sensing array 110 may include a plurality of sensing electrodes. Respective examples of the touch sensing array 110 of FIG. 4 are shown in FIGS. 5A and 5B.

Figure 5A:
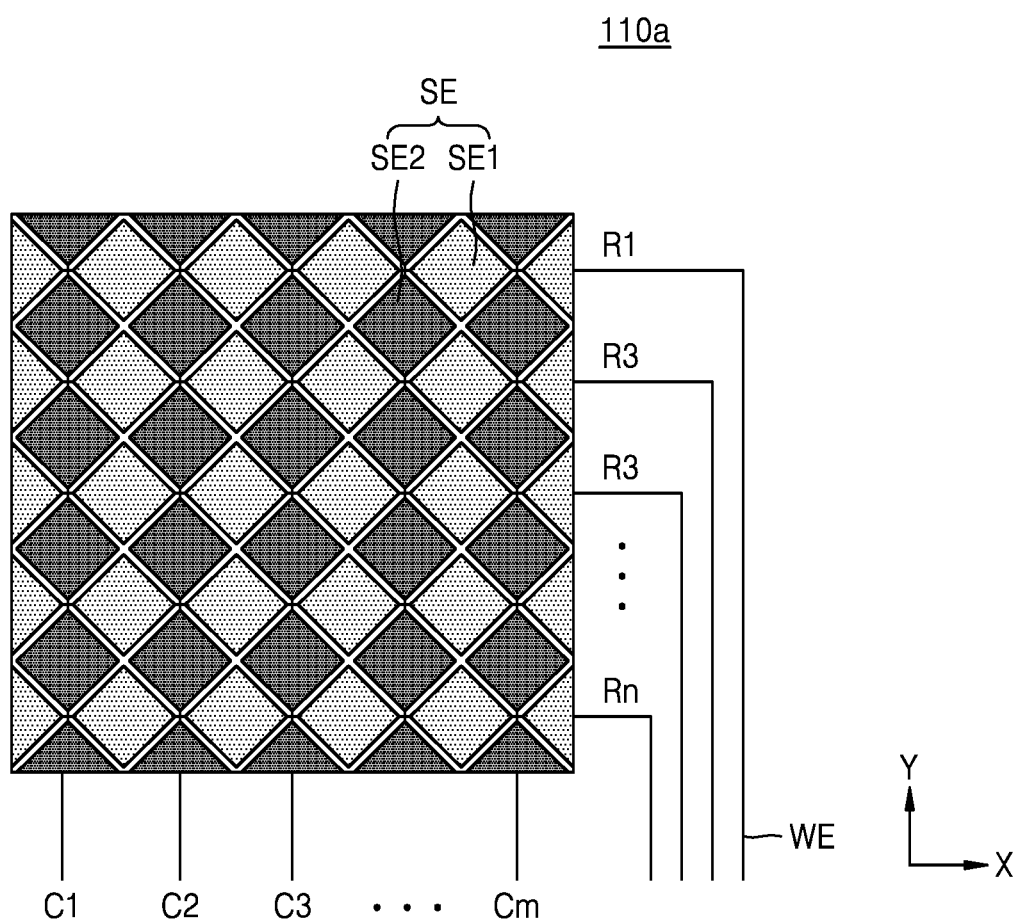
FIGS. 5A and 5B are diagrams further illustrating in one example the touch sensing array.

Referring to FIG. 5A, a touch sensing array 110a includes a plurality of sensing electrodes (e.g., row electrodes SE1 and column electrodes SE2) arranged in a first direction (e.g., an X-axis direction) and a second direction (e.g., a Y-axis direction). The respective shapes (e.g., length, wide, separation, etc.) of the row electrodes SE1 and the column electrodes SE2 may vary with design objectives. For example, the row electrodes SE1 may be electrically connected to one another in order to configure row channels R1 to Rn, and the column electrodes SE2 may be electrically connected to one another in order to configure column channels C1 to Cm. The row channels R1 to Rn and the column channels C1 to Cm may be electrically connected to the touch controller 200 through a wiring WE often referred to as a "trace". In certain embodiments, the row channels R1 to Rn and the column channels C1 to Cm are disposed at a same layer or at different layers of a stacked plurality of layers forming the touch sensing array 110a.

Figure 5B:
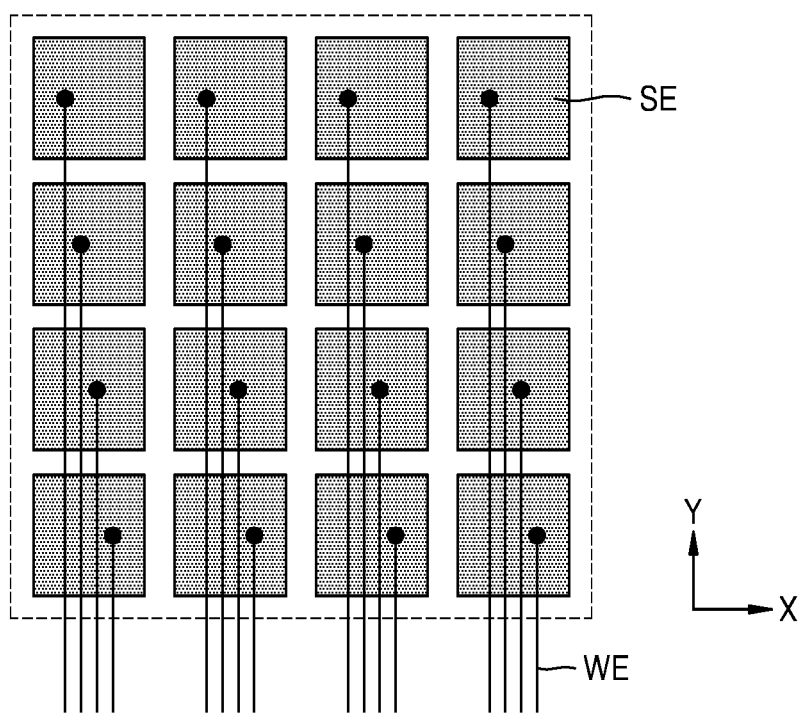

Referring to FIG. 5B, a touch sensing array 110b includes sensing electrodes SE arranged in a matrix at the same layer, where each of the sensing electrodes SE is electrically connected to the touch controller 200 through a corresponding wiring WE. In structures where respective wiring WE is connected to a corresponding sensing electrodes SE (e.g., FIG. 3B) each of the sensing electrodes SE may be referred to as a "dot sensor".

Here, the touch sensing array implementation described with reference to FIGS. 5A and 5B are merely convenient examples. Those skilled in the art will recognize that the touch sensing array may be variously implemented using sensing electrodes of varying shapes.

Referring again to FIG. 4, the touch controller 200 includes a controller 210, a sensing circuit 220, a processor 230, and a memory (MEM) 240, where the sensing circuit 220 may include an analog front-end ("AFE") 221 and an analog-to-digital converter ("ADC") 222, among other elements not shown.

The controller 210 may be used to control the overall operation of the touch controller 200, and the touch sensing timing associated with the sensing circuit 220 in particular. Here, the controller 210 may receive the display timing signal Tsig from the DDI 300 and control the touch sensing timing in response to the display timing signal Tsig. Also, the controller 210 may change the polarity of a driving signal Sdry according to a change in display frame (or a change in a set of display frames) in response to the display timing signal Tsig. For example, the controller 210 may generate a touch sensing control signal synchronously with the display timing signal Tsig, and provide the touch sensing control signal to the AFE 221. The touch sensing control signal may include a timing control signal and/or a code signal used to change the polarity of the driving signal Sdrv. In certain embodiments, various code signals used to generate the driving signal Sdry may be stored in the memory 240, such that the controller 210 may provide the AFE 221 with an appropriate code signals selected from the memory 240 synchronously with the display timing signal Tsig.

The AFE 221 may be used to perform touch sensing in response to various touch sensing control signal(s). For example, the AFE 221 may perform touch sensing one or more times during a single display frame, and/or when the display frame changes. The AFE 221 may also control the changing of the driving signal Sdry polarity. For example, the AFE 221 may change the polarity of the driving signal Sdry in response to the code signal provided by controller 210.

The AFE 221 may provide the driving signal Sdry to one or more channels of the touch sensing array 110, and/or receive sensing signals Ssen from one or more channels (e.g., the same channels or different channels). In this regard, the AFE 221 may include one or more amplifier(s) (e.g., current amplifier(s)) that may be used to amplify and convert the sensing signals Ssen into corresponding analog touch values.

The ADC 222 may then be used to convert the analog touch values provided by the AFE 221 into digital touch values. In this manner, the ADC 222 may provide the processor 230 with touch data ("Tdt") including the digital touch values.

The processor 230 may be used to calculate touch coordinates Txy in response to the touch data Tdt provided by the ADC 222. In certain embodiments, the processor 230 may cause the touch data Tdt, as provided by the ADC 222, to be stored in the memory 240. Thereafter, the processor 230 may calculate the touch coordinates Txy from the stored touch data Tdt.

Figure 6:
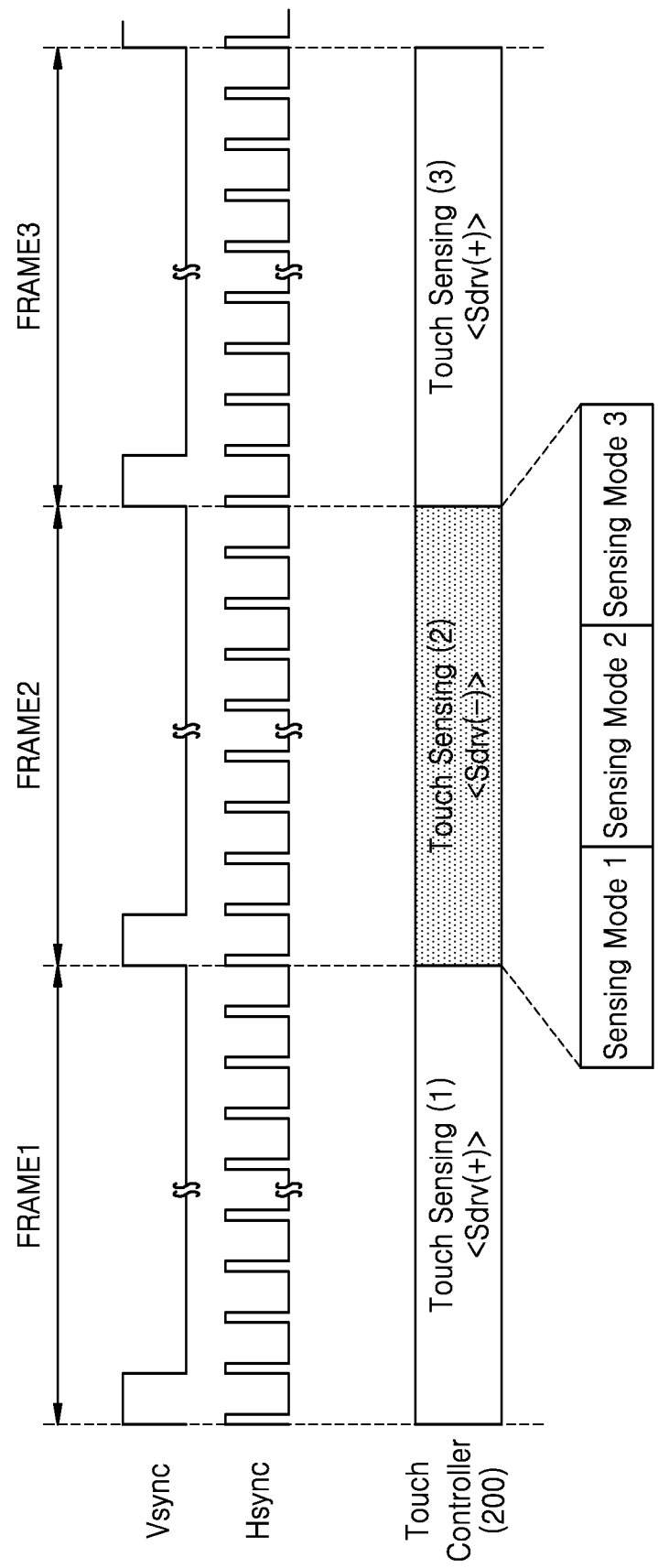
FIG. 6 is a timing diagram illustrating a touch sensing method of a touch controller.

FIG. 6 is a timing diagram further illustrating in one example a touch sensing method that may be used in conjunction with the touch controller 200 of FIGS. 1 and 4.

Referring to FIGS. 1, 4 and 6, the touch controller 200 may be used to perform touch sensing synchronously with the timing signal Tsig provided by the DDI 300. In certain embodiments, the timing signal Tsig may include a vertical synchronization signal Vsync and a horizontal synchronization signal Hsync, where the vertical synchronization signal Vsync indicates a display frame period.

As illustrated in the example of FIG. 6, the touch controller 200 may perform touch sensing in synchronization with the vertical synchronization signal Vsync once every display frame period, but this is just one possible example. In other embodiments, touch sensing may be performed more than once during a display frame period. When one-time touch sensing is performed, for example, the entire touch sensing array 110 may be sensed, and the touch controller 200 may calculate touch coordinates Txy in response to the sensing result.

The DDI 300 may be used to provide the image signals Simg to the display panel 120 synchronously with the horizontal synchronization signal Hsync (e.g., in response to a rising edge or a falling edge of the horizontal synchronization signal Hsync). Display noise is relatively high when the image signals Simg are output to the display panel 120. However, operating synchronously with the horizontal synchronization signal Hsync, the touch controller 200 may determine a "driving period" during which the image signals Simg are not being output to the display panel 120, cause the driving signal Sdry to be provided to the touch sensing array during the driving period, and receive the corresponding sensing signal(s) Ssen from the touch sensing array 110.

The touch controller 200 may also be used to change the polarity of the driving signal Sdry when a display frame (or "frame") is changed. For example, as shown in FIG. 6, the touch controller 200 may output the driving signal Sdry having the first polarity (+) to the touch sensing array 110 during a first frame period FRAME1, a driving signal Sdry having a second polarity (−) during in a second frame period FRAME2, and the driving signal Sdry having the first polarity (+) during a third frame period FRAME3.

In the embodiment illustrated in FIG. 6, the polarity of the driving signal Sdry is changed with every frame, but this is just one possibility. In other embodiments, the polarity of the driving signal Sdry may be changed according to N frame changes defining a set of frames.

However, consistent with the illustrated embodiment of FIG. 6, when one-time touch sensing is performed, the touch controller 200 may drive the touch sensing array 110 a number of times in response to various sensing modes (e.g., a first sensing mode, a second sensing mode, and a third sensing mode). For example, such sensing modes may include a mutual capacitance sensing mode, a self-capacitance sensing mode, and a touch force sensing mode.

Accordingly, the touch controller 200 may drive the touch sensing array 110 two times in response to the mutual capacitance sensing mode and the self-capacitance sensing mode. The touch controller 200 may be used to calculate touch coordinates Txy based on first touch data generated as a driving result of the mutual capacitance sensing mode and second touch data generated as a driving result of the self-capacitance sensing mode.

As another example, the touch controller 200 may drive the touch sensing array 110 three times in response to the mutual capacitance sensing mode, the self-capacitance sensing mode, and the touch force sensing mode. Again the touch controller 200 may be used to calculate the touch coordinates Txy based on first touch data generated as a driving result of the mutual capacitance sensing mode, second touch data generated as a driving result of the self-capacitance sensing mode, and third touch data generated as a driving result of the touch force sensing mode. Additional or alternate mode may be used to calculate the touch coordinates Txy.

Driving signals Sdry associated with different sensing modes may be applied during a one-time touch sensing operation, and may have different voltage levels and/or different frequencies. However, the polarity of the respective driving signals Sdry corresponding to the different sensing modes may be changed according to a changing of display frame or a changing of display frame set.

Figure 7A:
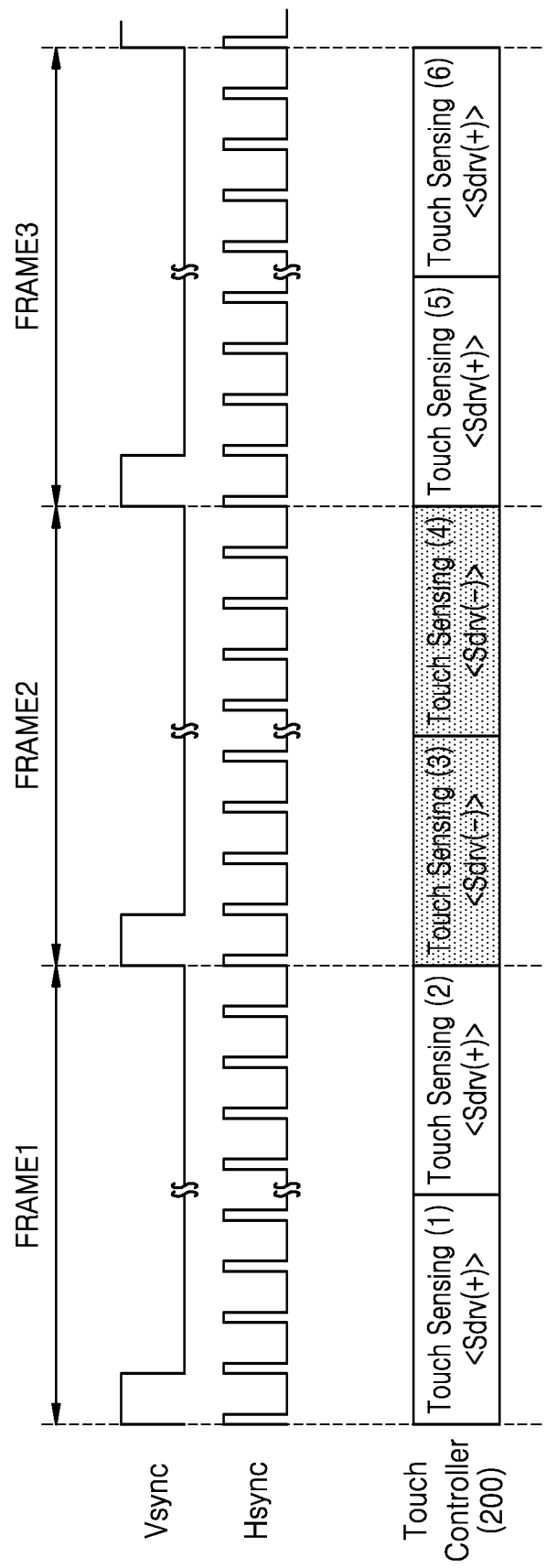
FIG. 7A is a timing diagram illustrating in one example the touch sensing method of a touch controller.
Figure 7B:
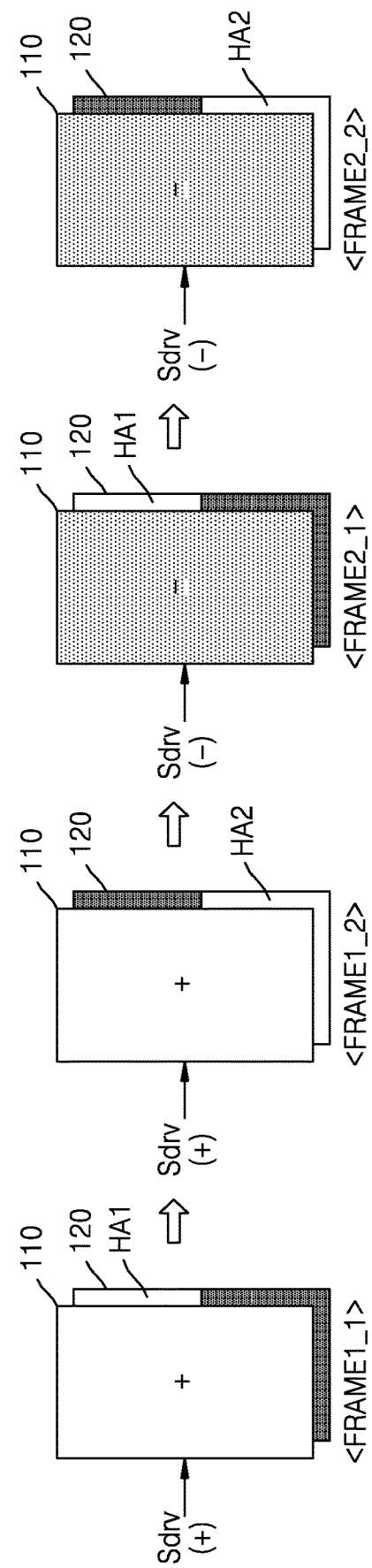
FIG. 7B is a diagram illustrating a touch screen in relation to the touch sensing method of FIG. 7A.

FIG. 7A is a timing diagram illustrating another example of a touch sensing method that may be used with the touch controller 200 of FIGS. 1 and 4, and FIG. 7B is a diagram illustrating the state of a touch screen based on the touch sensing method of FIG. 7A.

The illustrated example of FIG. 7A assumes that touch sensing is performed two times during each frame period. Hence, the touch controller 200 may output a driving signal Sdry having the same polarity when touch sensing is twice performed during each frame period. However, when a frame is changed, the touch controller 200 changes the polarity of the driving signal Sdry accordingly. For example, as illustrated in FIG. 7A, the touch controller 200 may perform first touch sensing and second touch sensing during a first frame period FRAME1 in response to a driving signal Sdry having a first polarity (+). Then, the touch controller 200 may perform a third touch sensing and a fourth touch sensing during a second frame period FRAME2 in response to the driving signal Sdry having a second polarity (−), and so forth.

Referring to FIG. 7B, when an image is displayed on a first region HA1 of the display panel 120 during a first half FRAME1_1 of the first frame period FRAME1, the driving signal Sdry having the first polarity (+) is applied to the touch sensing array 110. When an image is displayed on a second region HA2 of the display panel 120 during a second half FRAME1_2 of the first frame period FRAME1, the driving signal Sdry having the first polarity (+) remains applied to the touch sensing array 110. Here, it is assumed that during the first frame period FRAME1, the display panel 120 may be adversely affected by the driving signal Sdry having the first polarity (+) being applied to the touch sensing array 110.

Subsequently, when an image is displayed on a first region HA1 of the display panel 120 during in a first half FRAME2_1 of the second frame period FRAME2, the driving signal Sdry having the second polarity (−) is applied to the touch sensing array 110, and when an image is displayed on a second region HA2 of the display panel 120 during a second half FRAME2_2 of the second frame period FRAME2, the driving signal Sdry having the second polarity (−) remains applied to the touch sensing array 110. Here, it is assumed that during the second frame period FRAME2, the display panel 120 may be adversely affected by the driving signal Sdry having the second polarity (−) being applied to the touch sensing array 110.

A comparative example of the foregoing will now be described in relation to FIGS. 8A and 8B. Here, similar assumptions are made, except the period for the driving signal Sdry with respect to the alternating first and second polarities is offset from the period of change for the display frames. Accordingly, the driving signal Sdry having the second polarity (−) is continuously applied across the second half of the first display frame FRAME1_2 and the first half of the second display frame FRAME2_1, and thereafter the driving signal Sdry having the first polarity (+) is continuously applied across the second half of the second display frame FRAME2_2 and the first half of the third display frame FRAME3_1.

Figure 8A:
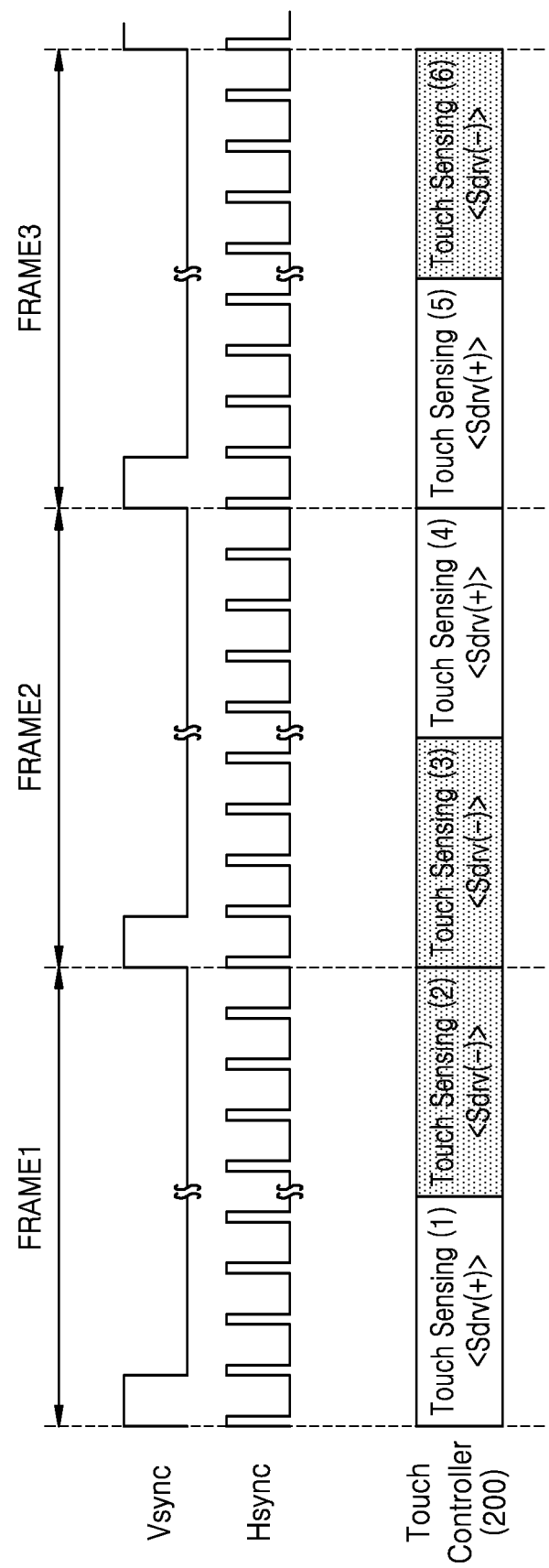
FIG. 8A is a timing diagram illustrating an example of a touch sensing method of a touch controller.

Thus, as illustrated in FIG. 8A, during a first frame period FRAME1, the touch controller 200 performs a first touch sensing based on a driving signal Sdry having a first polarity (+), and then performs a second touch sensing based on a driving signal Sdry having a second polarity (−). Subsequently, during a second frame period FRAME2, the touch controller 200 perform a third touch sensing based on the driving signal Sdry having the second polarity (−), and then performs a fourth touch sensing based on the driving signal Sdry having the first polarity (+).

Referring to FIG. 8B, when an image is displayed on a first region HA1 of the display panel 120 during a first half period FRAME1_1, a driving signal Sdry having a first polarity (+) is applied to the touch sensing array 110. When an image is displayed on a second region HA2 of the display panel 120 during a second half period FRAME1_2, a driving signal Sdry having a second polarity (−) is applied to the touch sensing array 110. Here, it is assumed that during the first frame period FRAME1, the first region HA1 of the display panel 120 may be adversely affected by the driving signal Sdry having the first polarity (+) being applied to the touch sensing array 110, and the second region HA2 may be adversely affected by the driving signal Sdry having the second polarity (−) being applied to the touch sensing array 110.

Subsequently, when an image is displayed on the first region HA1 of the display panel 120 during the first half period FRAME2_1, the driving signal Sdry having the second polarity (−) is applied to the touch sensing array 110, and when the image is displayed on the second region HA2 of the display panel 120 during the second half period FRAME2_2, the driving signal Sdry having the first polarity (+) is applied to the touch sensing array 110. Thus, it is assumed that during the second frame period, the first region HA1 of the display panel 120 may be adversely affected by the driving signal Sdry having the second polarity (−) being applied to the touch sensing array 110, and the second region HA2 may be adversely affected by the driving signal Sdry having the first polarity (+) being applied to the touch sensing array 110.

From the foregoing, it may be understood that different display panel designs exhibiting different noise sensitivities to various driving signals Sdry having different polarities may be compensated for by definition of the driving signals characteristics and application timing.

Figure 9:
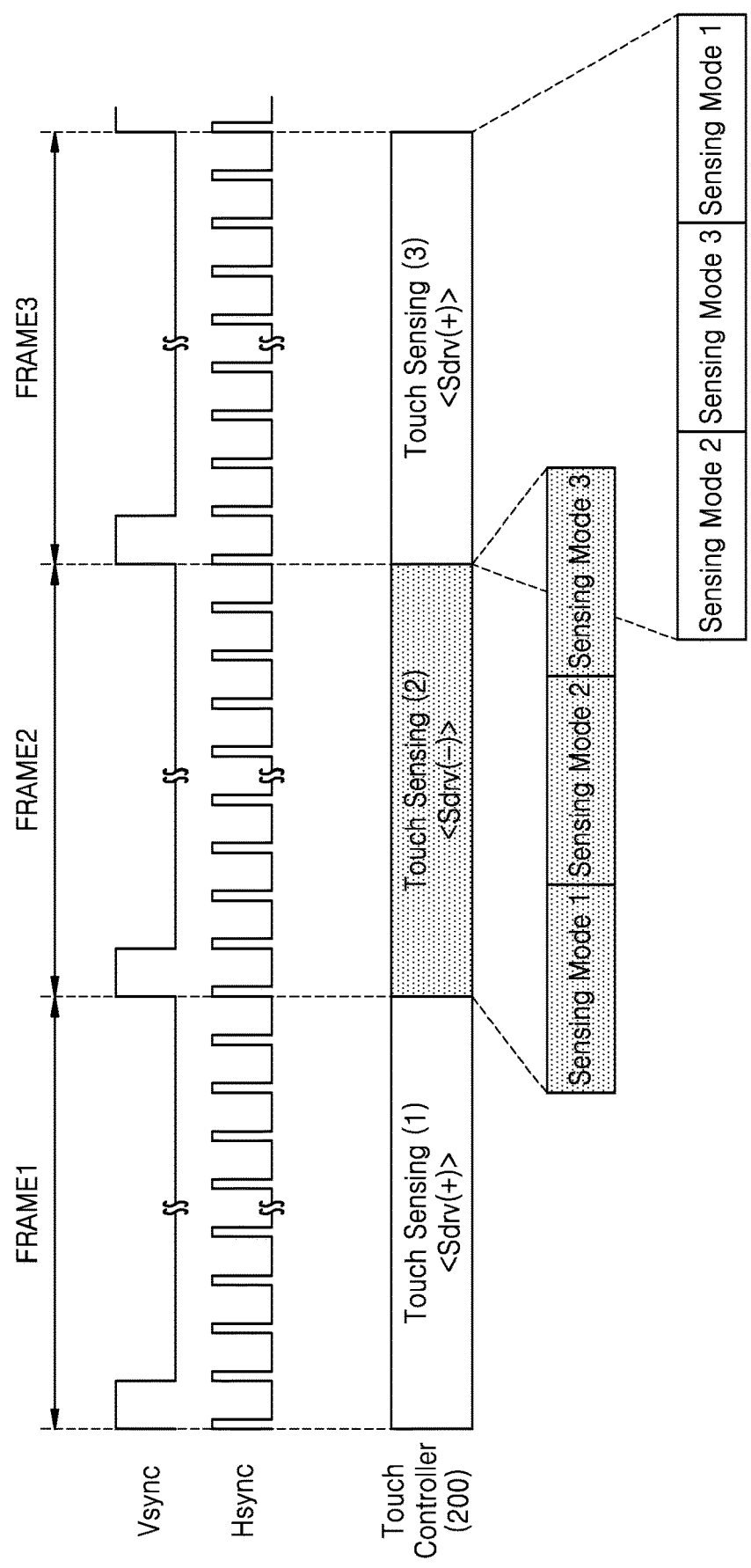
FIG. 9 is a timing diagram illustrating an example of a touch sensing method of a touch controller.

FIG. 9 is still another timing diagram illustrating an example of a touch sensing method that may be used in conjunction with the touch controller of FIGS. 1 and 4.

Referring to FIG. 9, when one-time touch sensing is performed, the touch controller 200 may drive the touch sensing array 110 a number of times in response to various sensing modes (e.g., first, second, third, etc. sensing modes) as well as in response to frame changing or frame set changing.

For example, as illustrated in FIG. 9, the touch controller 200 may perform touch sensing during a second frame FRAME2 in sequential response to a first sensing mode, a second sensing mode and a third sensing mode. In contrast, during a succeeding third frame period FRAME3, the touch controller 200 may perform touch sensing in sequential response to the second sensing mode, the third sensing mode, and the first sensing mode. In this manner, for each change in display frame (or set of display frames), the touch controller 200 may vary the applied sequence of sensing mode. However, this variation in the application sequence of multiple sensing modes need not change the previously described changing of polarity of the driving signal Sdrv.

In this manner, when a frame changes (or frame set changes), the touch controller 200 may change the polarity of the driving signal Sdrv, while also varying the order in which multiple sensing modes are applied, thereby preventing a constituent display panel (or a portion of a display panel) from being adversely affected by noise associated with the application of the driving signal Sdrv.

Figure 10:
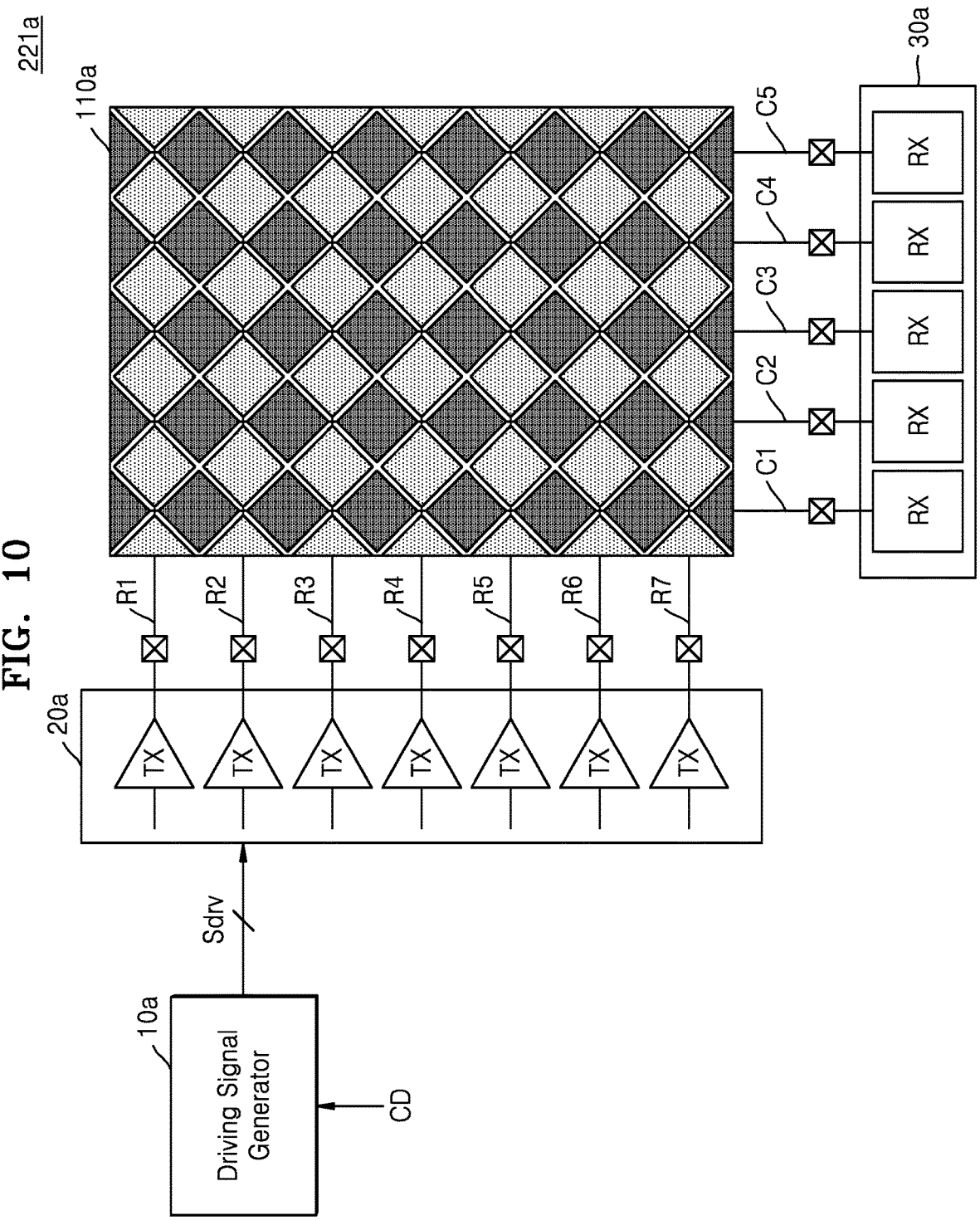
FIG. 10 is a block diagram further illustrating in one example the analog front-end (AFE) of FIG. 4.

FIG. 10 is a block diagram further illustrating in one embodiment the AFE 221 of FIG. 4. For convenience of description, a touch sensing array 110a is also illustrated in FIG. 4.

Referring to FIG. 10, an AFE 221a includes a driving signal generator 10a, a transmission unit 20a, and a reception unit 30a, where the transmission unit 20a includes a plurality of transmitters TX and the reception unit 30a includes a plurality of receivers RX.

The driving signal generator 10a may be used to generate the driving signal Sdry having a changeable polarity. In certain embodiments, the driving signal generator 10a may generate the driving signal Sdry in response to a code signal CD provided by a controller (e.g., element 210 of FIG. 3). Here, the driving signal Sdry may be generated with the first polarity (+) in response to a first code signal CD, or with the second polarity (−) in response to a second code signal CD different from the first code signal. For example, receipt of a first code signal CD "01" may result in the driving signal generator 10a generating the driving signal Sdry having the first polarity (+), while receipt of a second code signal CD "10" may result in the driving signal generator 10a generating the driving signal Sdry having the second polarity (−).

The transmitters TX of the transmission unit 20a may be used to output respective driving signals Sdry in response to the driving signal Sdry provided by the driving signal generator 10a. Analogously, the receivers RX of the reception unit 30b may be used to respectively receive sensing signals generated in response to the driving signals Sdry by sensing electrode SE of the touch sensing array 110a.

Figure 11:
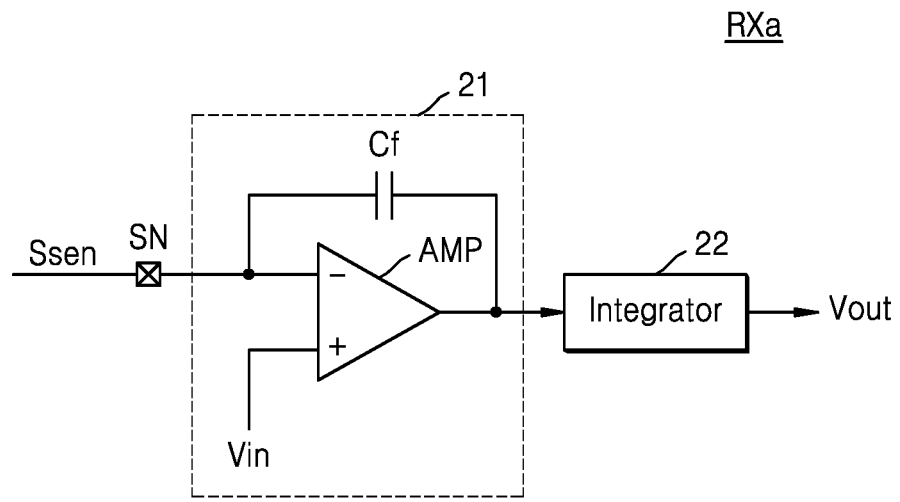
FIG. 11 is a circuit diagram further illustrating in one example the receiver (RX) of FIG. 10.

FIG. 11 is a circuit diagram further illustrating in one embodiment a receiver RX that may be used in the reception unit 30b of FIG. 10.

Referring to FIG. 11, the receiver RXa includes a charge amplifier 21 and an integrator 22, where in one particular embodiment, the charge amplifier 21 includes an amplifier AMP and a feedback capacitor Cf. Here, the amplifier AMP may include a first input terminal connected to a sensing node SN, a second input terminal receiving an input voltage Vin, and an output terminal outputting a sensing voltage. The feedback capacitor Cf may be connected between the first input terminal and the output terminal. The charge amplifier 21 may amplify and convert a received sensing signal Ssen (e.g., a current signal) into a corresponding sensing voltage. The integrator 22 may integrate (or accumulate) the sensing voltage provided by the charge amplifier 21. For example, the integrator 22 may repeatedly perform an integrating operation in response to a control signal provided by the controller (e.g., element 210 of FIG. 3). The integrator 22 may output an integrated voltage Vout as an analog touch value, where the ADC 222 of FIG. 4 may be used to convert the analog touch value into a corresponding digital value.

Referring back to FIG. 10, the respective transmitters TX of the transmission unit 20a may be respectively connected to row channels (e.g., R1 to R7) of the touch sensing array 110a, and the receivers RX of the reception unit 30b may be respectively connected to column channels (e.g., C1 to C5) of the touch sensing array 110a. In certain embodiments, the row channels may operate as driving channels, but this need not always be the case.

However, the row channels and/or column channels are configured, the AFE 221a of FIG. 10 may be used to sense touch inputs to the touch sensing array 110a using a mutual capacitance sensing mode and/or a self-capacitance sensing mode.

Figure 12:
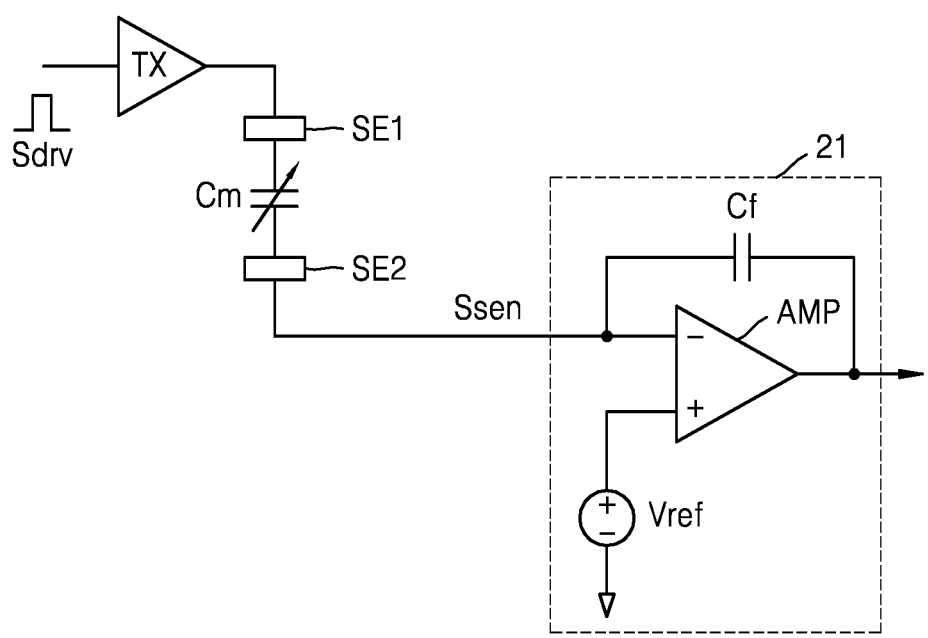
FIG. 12 is a diagram for describing a mutual capacitance sensing mode.

FIG. 12 is a circuit diagram further illustrating in one example a mutual capacitance sensing mode that may be used in the context of the foregoing embodiments.

Referring to FIG. 12, when one or more transmitters TX transmit a driving signal Sdry to driving channels (e.g., row channels R1 to R7), a sensing signal Ssen corresponding to a mutual capacitance Cm between a first sensing electrode SE1 (e.g., a driving electrode) and a second sensing electrode SE2 connected to a corresponding driving channel of the driving channels may be output. In this case, the second sensing electrode SE2 may be an electrode which is disposed adjacent to the first sensing electrode SE1 and is connected to a receiving channel (e.g., column channels— C1 to C5). Charge amplifier(s) 21 associated with one or more receivers RX may amplify and convert the sensing signal Ssen into a corresponding sensing voltage. Thus, when an object causes a touch input to the first sensing electrode SE1 and second sensing electrode SE2, a resulting mutual capacitance Cm may be reduced, thereby enabling a greater variability of the sensing signal Ssen. Accordingly, a more accurate touch value may be generated based upon a degree of variation in the sensing signal Ssen.

Figure 13B:
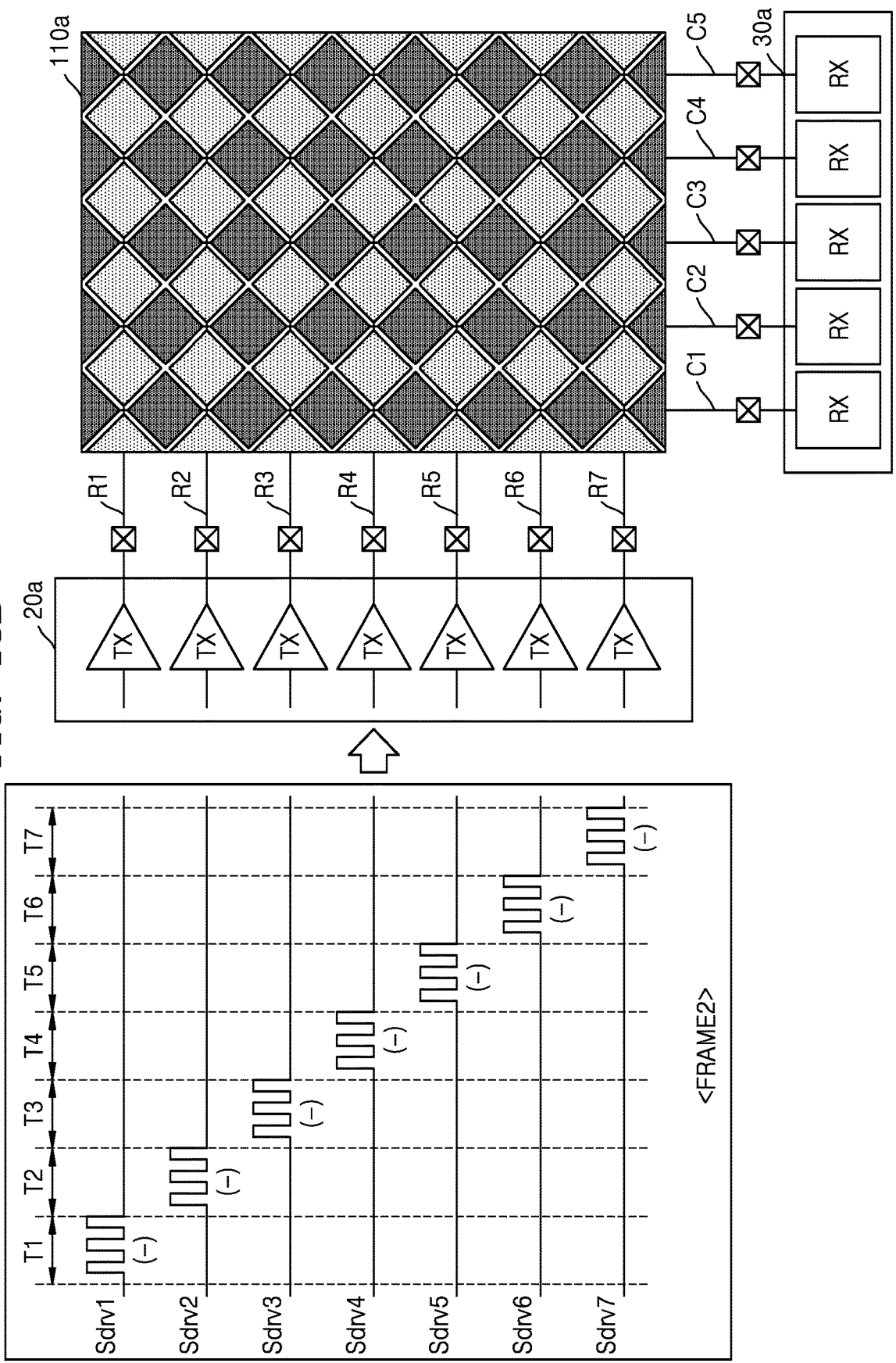

FIGS. 13A and 13B are diagrams further illustrating in one example a mutual capacitance sensing mode that may be used in the context of the foregoing embodiments.

Referring to FIGS. 13A and 13B, the transmission unit 20a may be used to sequentially apply driving signals (e.g., first to seventh driving signals, or Sdrv1 to Sdrv7) to row channels (e.g., R1 to R7) during respective periods (e.g., T1 to T7). The reception unit 30a may be used to facilitate the performing of a touch sensing operation by sequentially receiving sensing signals generated (e.g.) in response to the first driving signal Sdry 1 applied to the first row channel R1, the second driving signal Sdrv2 applied to the second row channel R2, and so on down to the seventh driving signal Sdrv7 applied to the seventh row channel R7.

Referring to FIG. 13A, during a first frame period FRAME1, the driving signals Sdrv1 to Sdrv7 having a first polarity (+) are applied to the row channels R1 to R7 of a touch sensing array 110a. Referring to FIG. 13B, during a second frame period FRAME2, the driving signals Sdrv1 to Sdrv7 having a second polarity (−) are applied to the row channels R1 to R7 of the touch sensing array 110a.

Figure 14:
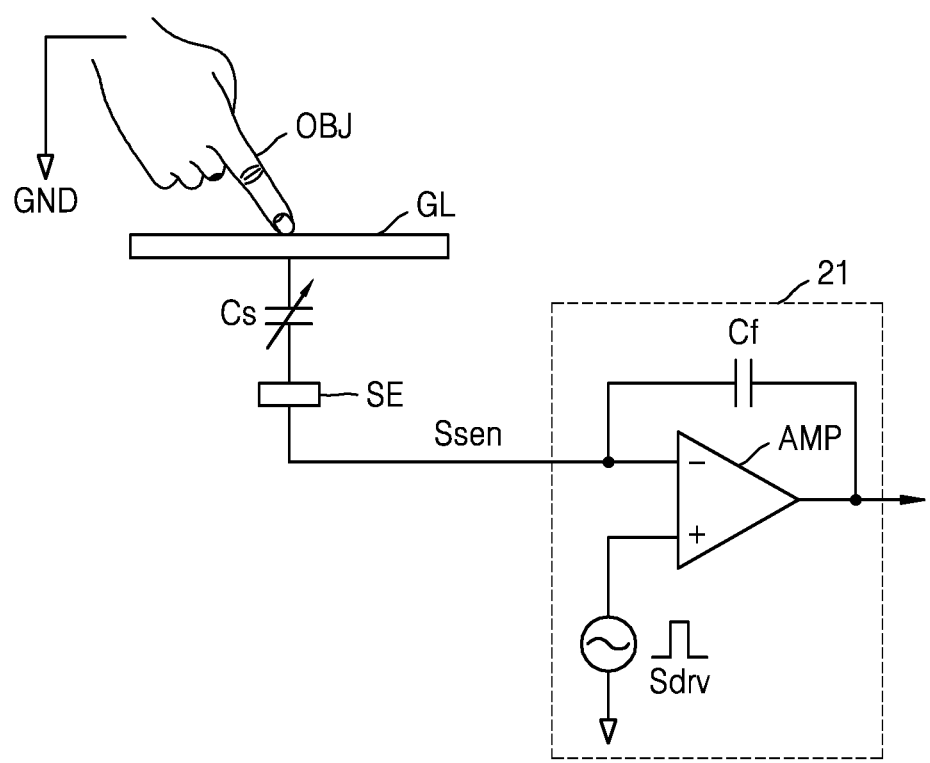
FIG. 14 is a diagram for describing a self-capacitance sensing method.

FIG. 14 is a diagram further illustrating in one embodiment a self-capacitance sensing mode that may be used in the context of the foregoing embodiments Referring to FIG. 14, when an object OBJ contacts or approaches a sensing electrode SE (i.e., causes a touch input), a self-capacitance Cs of a sensing electrode SE associated with the touch input increases. When the driving signal Sdry is applied as an input signal to a second input terminal of a charge amplifier 21 of a corresponding receiver RX, a first input terminal and the second input terminal will have about the same electrical potential. Thus, the driving signal Sdry may be provided to the sensing electrode SE through the first input terminal, whereby a sensing signal Ssen corresponding to the self-capacitance Cs may be output. The charge amplifier 21 may amplify and convert the sensing signal Ssen to output a sensing voltage.

Figure 15A:
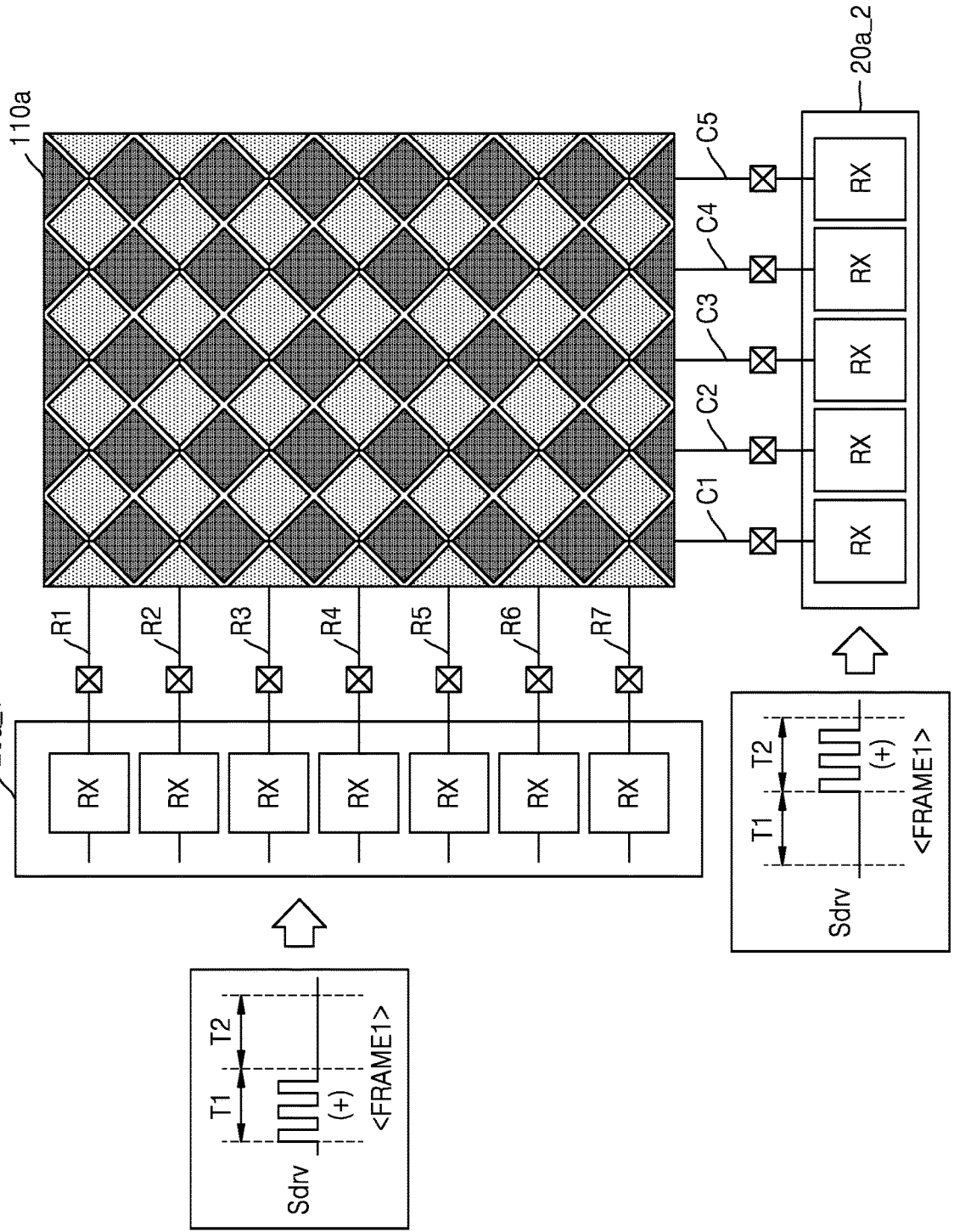
FIGS. 15A and 15B are diagrams illustrating a self-capacitance sensing mode.
Figure 15B:
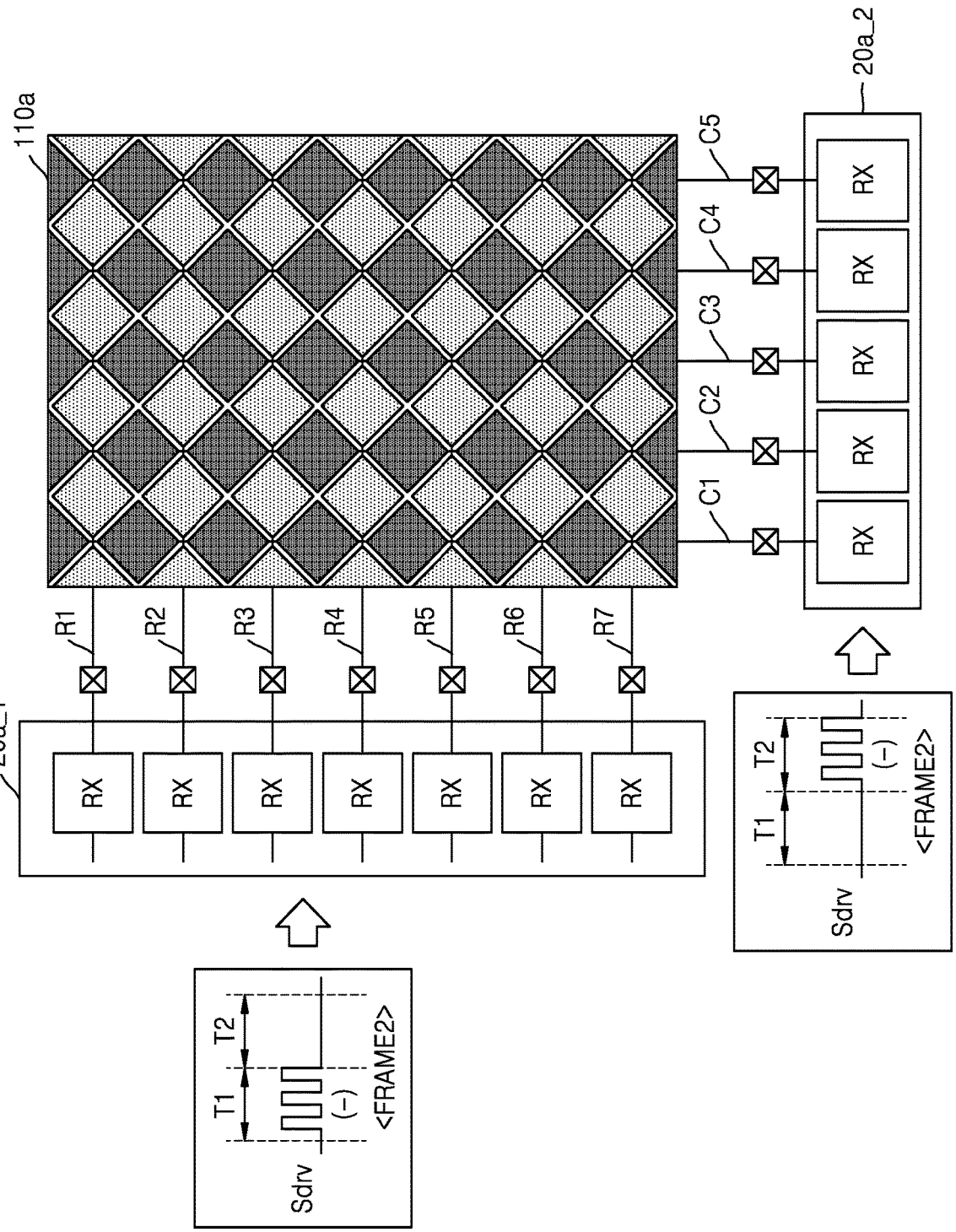

FIGS. 15A and 15B are diagrams further illustrating in one embodiment a self-capacitance sensing method that may be used in the context of the foregoing embodiments.

Referring to FIGS. 15A and 15B, a receiver RX is connected to row channels R1 to R7 and column channels C1 to C5 of a touch sensing array 110a. As described above with reference to FIG. 14, the receiver RX may be used to perform a transmission and reception operation.

During a first period T1, the driving signal Sdry may be simultaneously applied to the row channels R1 to R7, and thus, the row channels R1 to R7 may be sensed. Then, during a second period T2, the driving signal Sdry may be simultaneously applied to the column channels C1 to C5, and thus, the column channels C1 to C5 may be sensed.

Referring to FIG. 15A, during the first period T1 of a first frame period FRAME1, the driving signal Sdry having a first polarity (+) may be applied to the row channels R1 to R7, and during the second period T2 of the first frame period FRAME1, the driving signal Sdry having the first polarity (+) may be applied to the column channels C1 to C5.

Referring to FIG. 15B, during the first period T1 of a second frame period FRAME2, the driving signal Sdry having a second polarity (−) may be applied to the row channels R1 to R7, and during the second period T2 of the second frame period FRAME2, the driving signal Sdry having the second polarity (−) may be applied to the column channels C1 to C5.

Figure 16A:
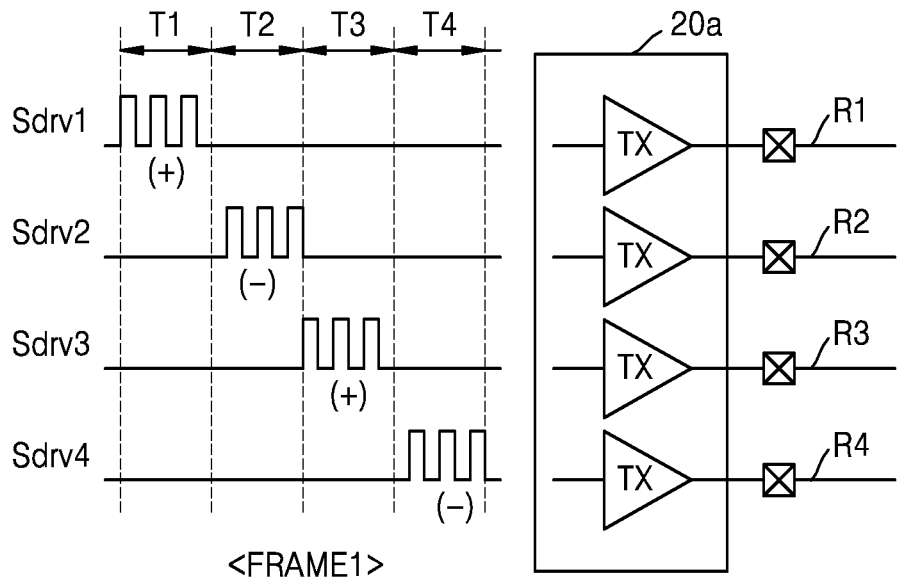
FIGS. 16A and 16B are diagrams illustrating examples of driving signals applied to a mutual capacitance sensing mode.
Figure 16B:
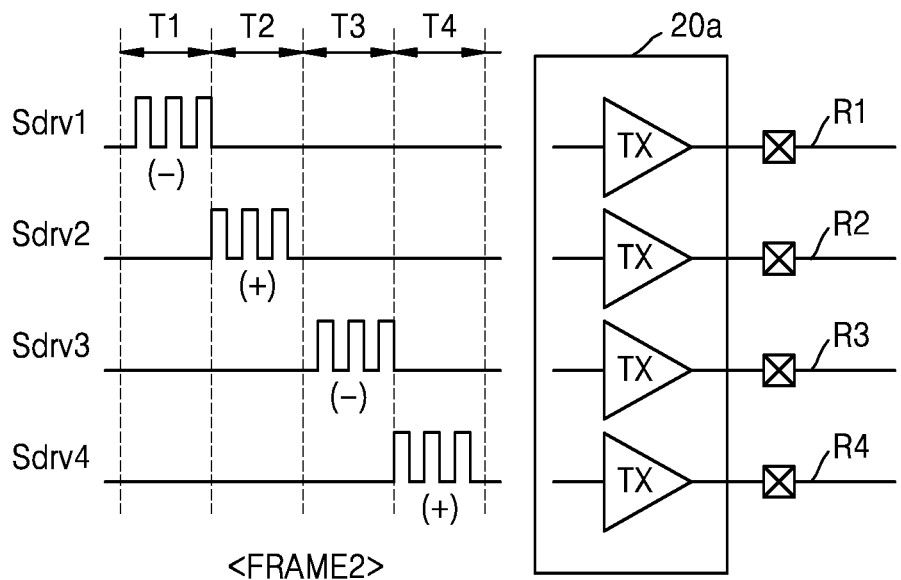

FIGS. 16A and 16B are diagrams further illustrating examples of driving signals applied to a mutual capacitance sensing mode according to the foregoing embodiments. For convenience of description, only a few, selected row channels R1 to R4 of a touch sensing array and driving signals Sdrv1 to Sdrv4 applied to the some row channels R1 to R4 are illustrated in FIGS. 16A, 16B, 17A and 17B.

Referring to FIGS. 16A to 16B, during first through fourth periods T1 to T4, a transmission unit 20a may sequentially apply a polarity-changeable driving signal (e.g., first through fourth driving signals, Sdrv1 to Sdrv4) to row channels (e.g., first to fourth row channels, R1 to R4). Referring to FIG. 16A, during a first frame period FRAME1, the first driving signal Sdrv1 and the third driving signal Sdrv3 have the first polarity (+) and are respectively applied to the first row channel R1 and the third row channel R3. The second driving signal Sdrv2 and the fourth driving signal Sdrv4 have the second polarity (−) and are respectively applied to the second row channel R2 and the fourth row channel R4. That is, driving signals having different polarities may be applied to adjacent row channels.

Referring to FIG. 16B, during a second frame period FRAME2, the first driving signal Sdrv1 and the third driving signal Sdrv3 having the second polarity (−) may be respectively applied to the first row channel R1 and the third row channel R3, and the second driving signal Sdrv2 and the fourth driving signal Sdrv4 having the first polarity (+) may be respectively applied to the second row channel R2 and the fourth row channel R4.

Figure 17A:
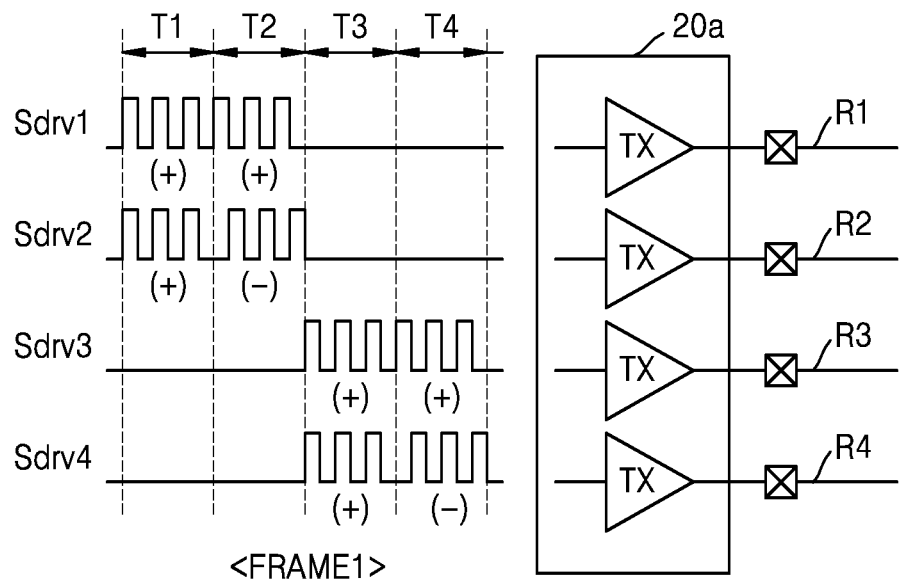
FIGS. 17A and 17B are diagrams illustrating a multi-driving mode.
Figure 17B:
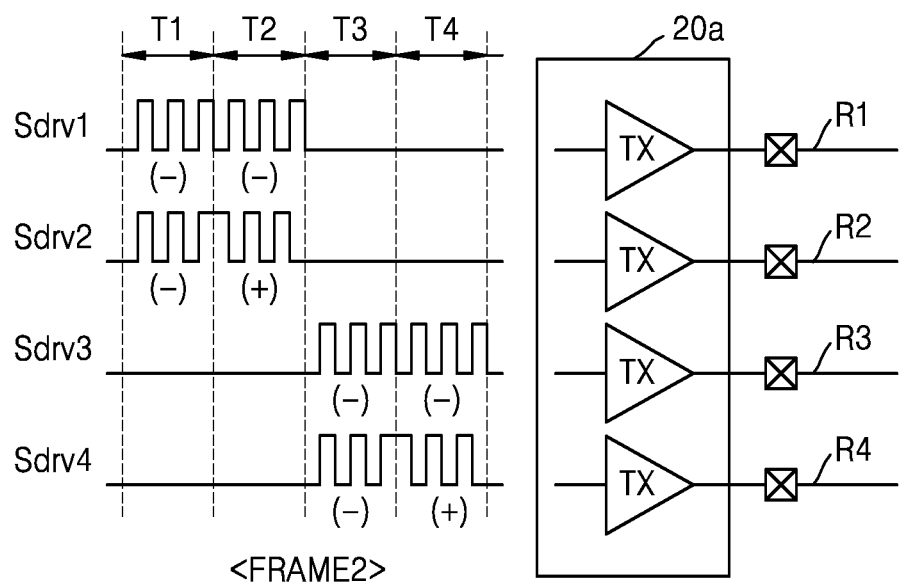

FIGS. 17A and 17B are diagrams further illustrating examples of a multi-driving mode.

Referring to FIGS. 17A to 17B, during first and second sequential periods T1 and T2, a first driving signal Sdrv1 and a second driving signal Sdrv2 may be respectively applied to a first row channel R1 and a second row channel R2 with the same polarity or with different polarities. Similarly, and during third and fourth sequential periods T3 and T4, a third driving signal Sdrv3 and a fourth driving signal Sdrv4 may be applied to a third row channel R3 and a fourth row channel R4 with the same polarity or different polarities.

Here, in a case where driving signals are applied to multiple row channels, sensing signals may include all signal components generated by the simultaneously applied driving signals having a same polarity. However, when the polarities of simultaneously applied driving signals are different (e.g., the corresponding codes signals are different) or stated in other terms, when touch data values are generated in response to various sensing signals, the processor 230 may decode the touch data values based on code value, thereby calculating touch data values respectively corresponding to the driving signals. As described above with reference to FIGS. 17A and 17B, a touch sensing method that changes the polarity of a driving signal when a frame is changed may be applied in the performing of touch sensing according to the multi-driving mode.

Figure 18A:
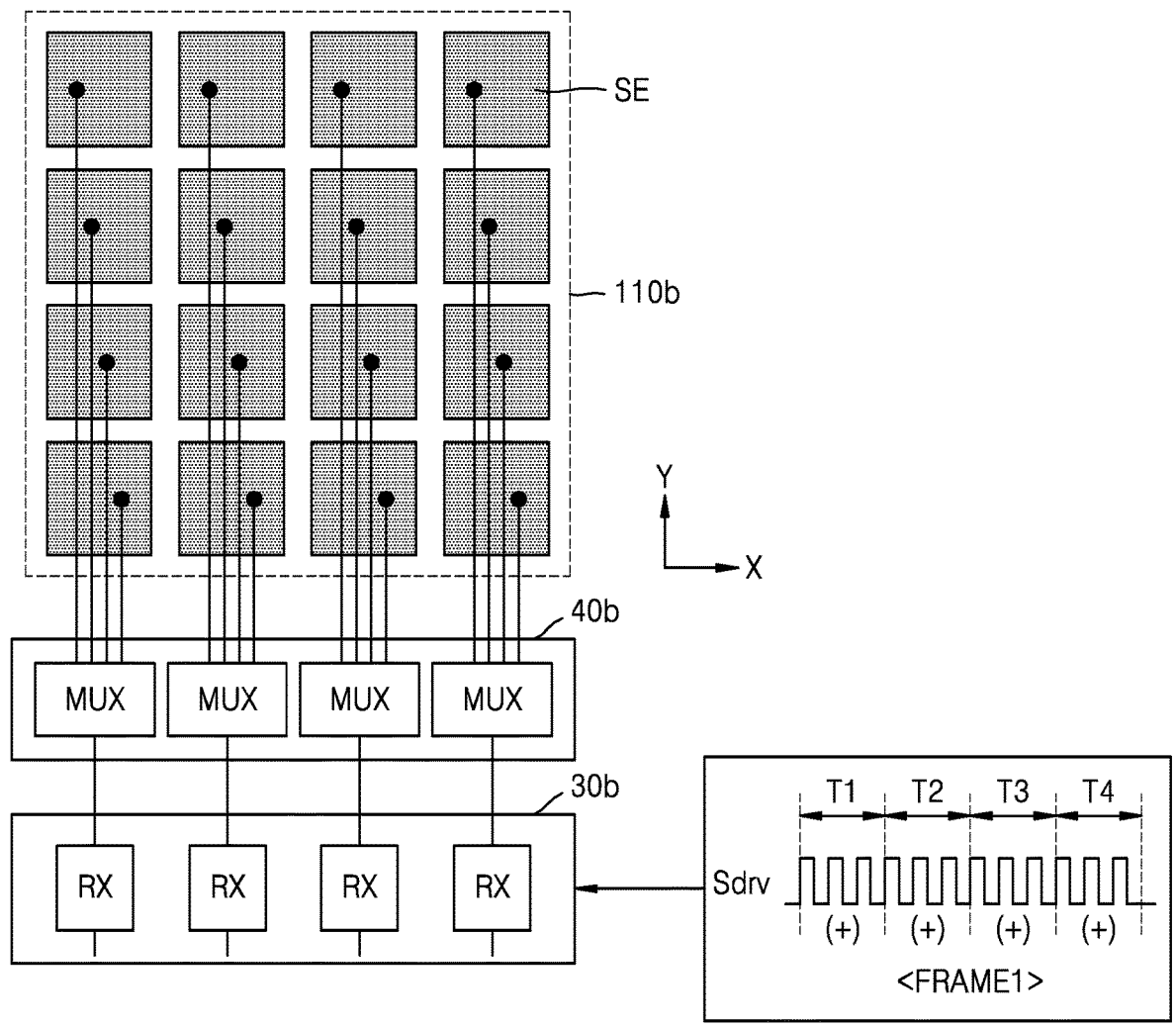
FIGS. 18A and 18B are diagrams illustrating a touch sensing method for a touch sensing array including a dot sensor.
Figure 18B:
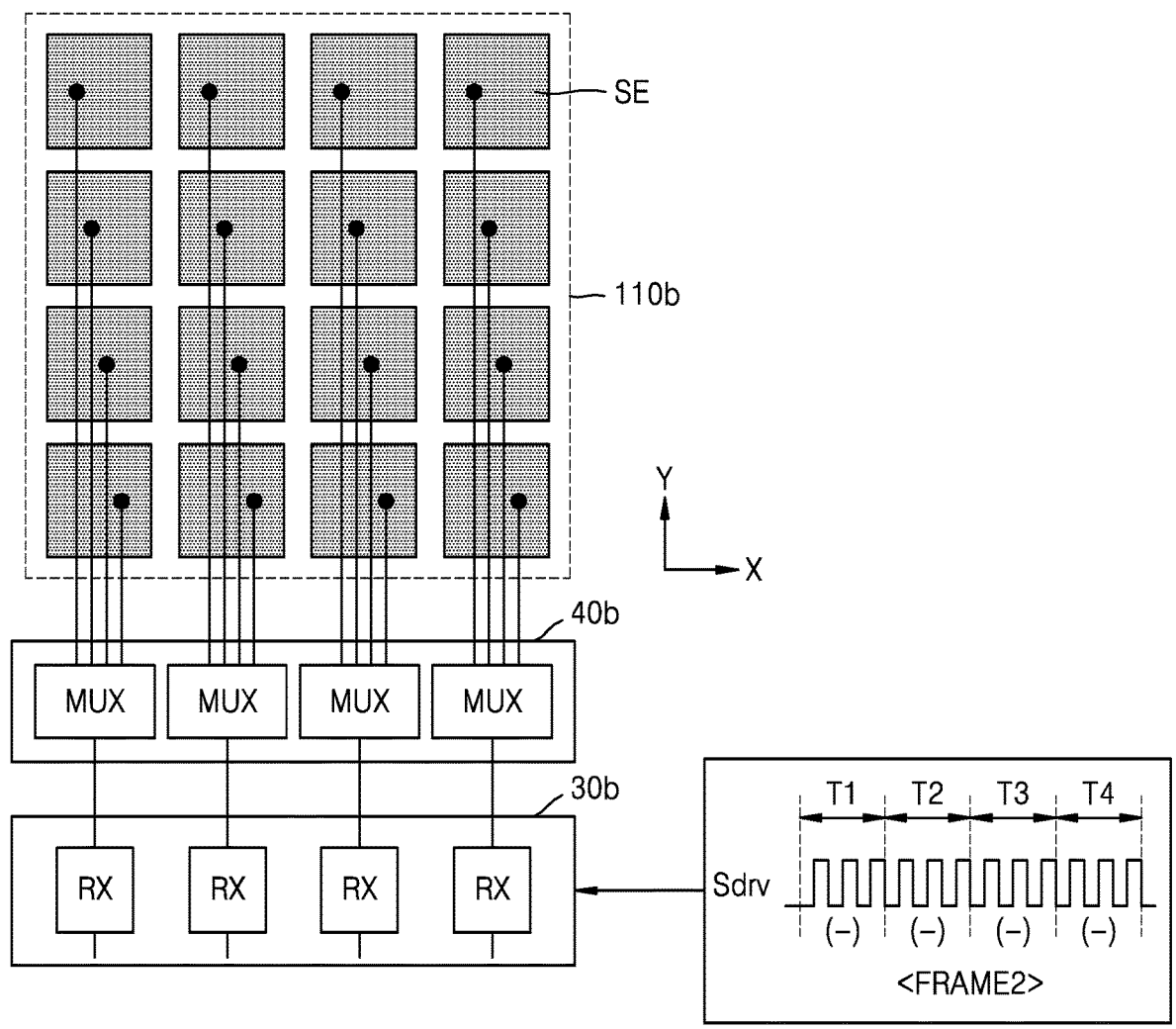

FIGS. 18A and 18B are diagrams further illustrating a touch sensing method that may be used in conjunction with a touch sensing array including a dot sensor.

Referring to FIGS. 18A and 18B, sensing electrodes SE (e.g., dot sensors) may be connected through a multiplexer MUX according to column units. Here, each sensing electrode SE selected by the multiplexer MUX may be electrically connected to a corresponding receiver RX. The multiplexer MUX may selectively connect the sensing electrodes SE to receivers RX in row units (e.g.) under the control of the controller 210 of FIG. 4. When a driving signal Sdry is applied to a receiver RX, the selected sensing electrode SE causes a sensing signal to be generated that may be output to the corresponding receiver RX.

Referring to FIG. 18A, during periods T1 to T4 of a first frame period FRAME1, a driving signal Sdry having the first polarity (+) may be applied to a sensing electrode SE. For example, during periods T1 to T4, the driving signal Sdry having the first polarity (+) may be sequentially applied to a first row through a fourth row.

Referring to FIG. 18B, during periods T1 to T4 of a second frame period FRAME2, a driving signal Sdry having the second polarity (−) may be applied to the sensing electrode SE. For example, during the periods T1 to T4, the driving signal Sdry having the second polarity (−) may be sequentially applied to the first row to the fourth row.

As described above, certain touch sensing methods using a polarity-changeable driving signal may be used in conjunction with a touch sensing array including dot sensors.

Figure 19:
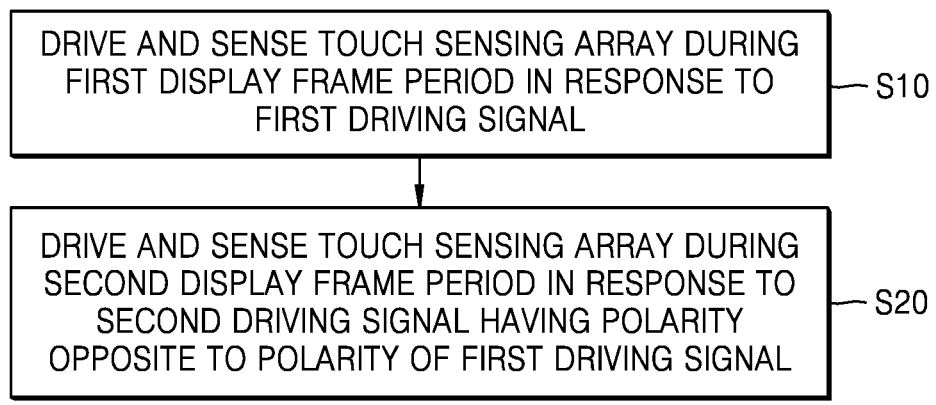
FIG. 19 is a flowchart illustrating a touch sensing method of a touch controller.

FIG. 19 is a flowchart illustrating a touch sensing method for a touch controller. The above-described embodiments may be applied to the illustrated touch sensing method.

Referring to FIG. 19, during a first display frame period, the touch controller may drive and sense a touch sensing array (110 of FIG. 1) in response to a first driving signal in operation S10. The touch controller may drive and sense the touch sensing array in synchronization with a display timing signal (Tsig of FIG. 1) provided from a DDI and may determine an image frame (i.e., a display frame) displayed by a display panel (120 of FIG. 1), based on the display timing signal Tsig. The touch controller may generate the first driving signal in the first display frame period and may perform a touch sensing operation in response to the first driving signal.

Subsequently, during a second display frame period, the touch controller may drive and sense the touch sensing array in response to a second driving signal having a polarity opposite to a polarity of the first driving signal in operation S20. The touch controller may generate the second driving signal having the opposite polarity during the second display frame period and may perform a touch sensing operation in response to the second driving signal. The first driving signal and the second driving signal may each be a pulse signal but have a 180-degree phase difference between respective pulses. In certain embodiments, the first driving signal and the second driving signal may have the same frequency. In this manner, the touch controller according to an embodiment may change a polarity of a driving signal when a display frame period is changed.

Figure 20:
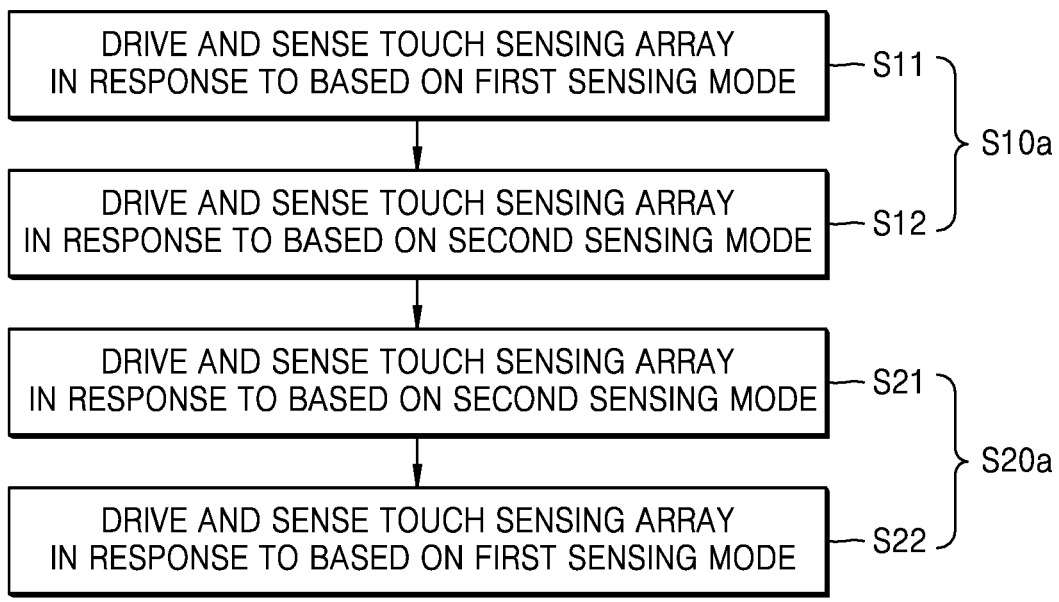
FIG. 20 is a flowchart illustrating an implementation example of the touch sensing method of FIG. 19.

FIG. 20 is a flowchart further illustrating the touch sensing method of FIG. 19.

In performing touch sensing one time (i.e., calculating touch coordinates one time), a touch sensing array may be driven and sensed a number of times through a sequence of disparate sensing modes.

Referring to FIG. 20, in performing touch sensing in response to a first driving signal during a first display frame period in operation S10a, the touch sensing array may be driven and sensed in response to a first sensing mode in operation S11, and then a second sensing mode in operation S12. On the other hand, in performing touch sensing based in response to the second driving signal during a second display frame period in operation S20a, the touch sensing array may be driven and sensed in response to the second sensing mode in operation S21, and then the first sensing mode in operation S22.

As described above, the touch sensing method may change polarity of a driving signal when a display frame changes, but still may change an application order for various sensing modes on a frame by frame basis, or frame set by frame set basis.

Figure 21:
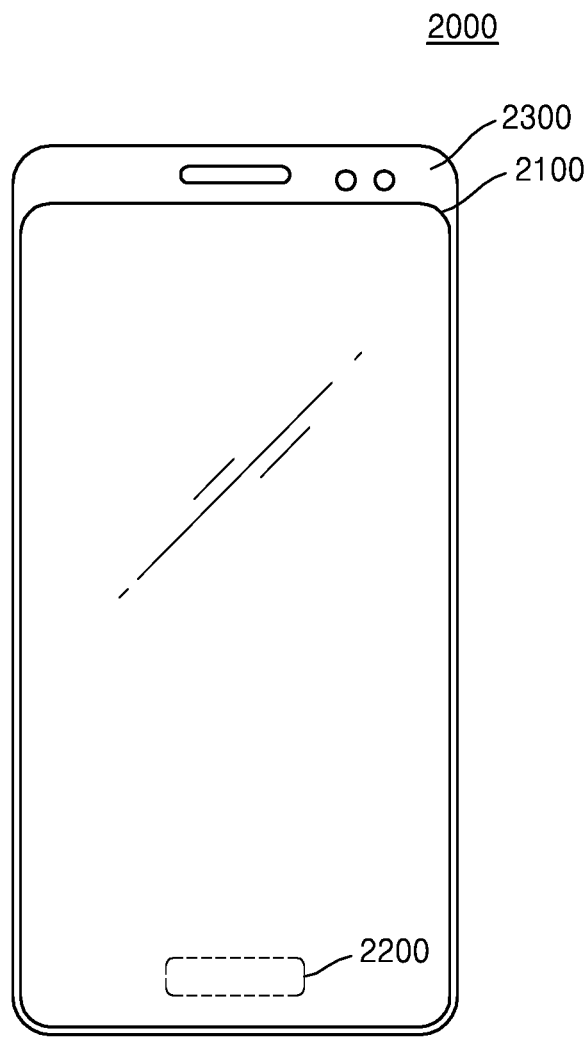
FIG. 21 is a diagram illustrating a smartphone.

FIG. 21 is a perspective diagram illustrating a smartphone 2000.

Referring to FIG. 21, the smartphone 2000 may include a touch screen 2100, a touch screen driving circuit 2200, and a housing 2300. The smartphone 2000 may also include an access point (AP) for controlling an overall operation of the smartphone 2000.

The housing 2300 may configure an external appearance of the smartphone 2000 and may protect internal elements (e.g., ICs, a battery, an antenna, etc.) of the smartphone 2000 from an external impact or a scratch. The touch screen driving circuit 2200 may be provided inside the housing 2300.

The touch screen 2100 may operate as an input/output (I/O) device of the touch screen device 1000 for display and touch sensing. In an embodiment, the touch screen 2100 may sense a force of a touch input. The touch screen driving circuit 2200 may control a display operation and a touch sensing operation of the touch screen 2100.

The touch screen 100, the driving IC DIC (i.e., the DDI 300), and the touch controller 200 of the touch screen device 1000 described above with reference to FIG. 1 may be applied to the smartphone 2000 according to an embodiment. The DDI 300 and the touch controller 200 may be applied to the touch screen driving circuit 2200.

The DDI 300 may provide the display timing signal to the touch controller 200, and the touch controller 200 may perform touch sensing in synchronization with the display timing signal in a period in which the amount of display noise is small. Also, as described above with reference to FIGS. 1 to 20, the touch controller 200 may change a polarity of the driving signal Sdrv when a display frame is changed, thereby solving a problem where image quality is degraded because touch sensing is performed in synchronization with the display timing signal. Accordingly, a touch sensing sensitivity of the smartphone 2000 is enhanced without degradation in image quality.

While the inventive concept has been particularly shown and described with reference to embodiments thereof, it will be understood that various changes in form and details may be made therein without departing from the spirit and scope of the following claims.

What is claimed is:

1. A touch controller comprising:
   a controller configured to receive a display timing signal from a display driving circuit configured to drive a display panel and generate a touch sensing control signal synchronously with the display timing signal; and
   a sensing circuit configured to drive a touch sensing array in response to the touch sensing control signal in order to generate touch data corresponding to sensing signals output from the touch sensing array, wherein:
   the sensing circuit generates a first driving signal having a first polarity and applies the first driving signal to at least one driving channel of the touch sensing array during a first display frame period in which a first frame image is displayed on the display panel, generates a second driving signal having a second polarity different from the first polarity and applies the second driving signal to the at least one driving channel of the touch sensing array during a second display frame period in which a second frame image is displayed on the display panel,
   the sensing circuit drives the touch sensing array to execute each of a first sensing mode and a second sensing mode, which differs from the first sensing mode, during the first display frame period, and
   each of the first sensing mode and the second sensing mode is a mutual-capacitance sensing mode, a self-capacitance sensing mode, or a touch force sensing mode.

2. The touch controller of claim 1, wherein a phase difference between the first polarity and the second polarity is 180 degrees.

3. The touch controller of claim 2, wherein the first driving signal and the second driving signal are pulse signals having the same frequency.

4. The touch controller of claim 1, wherein:
   the second display frame period sequentially follows the first display frame period, and
   the first driving signal is applied to a driving electrode of the touch sensing array during the first display frame period and the second driving signal is applied to the driving electrode during the second display frame period.

5. The touch controller of claim 1, wherein the display timing signal comprises at least one of a vertical synchronization signal and a horizontal synchronization signal provided by a display driving circuit providing the display timing signal.

6. The touch controller of claim 1, wherein:
the sensing circuit drives the touch sensing array more than one time during each one of the first display frame period and the second display frame period, and
the sensing circuit drives the touch sensing array at least twice during each one of the first display frame period and the second display frame period in response to a first sensing mode and a second sensing mode.

7. The touch controller of claim 1, wherein:
the sensing circuit drives the touch sensing array more than one time during each one of the first display frame period and the second display frame period,
the sensing circuit drives the touch sensing array during the first display frame period in response to a first sensing mode and then in response to a second sensing mode, and
the sensing circuit drives the touch sensing array during the second display frame period in response to the second sensing mode and then in response to the first sensing mode.

8. The touch controller of claim 1, further comprising a processor configured to calculate touch coordinates in response to the touch data.

9. The touch controller of claim 1, wherein the sensing circuit comprises an analog front end (AFE) including:
a driving signal generator configured to selectively generate at least one of the first driving signal and the second driving signal in response to the touch sensing control signal;
a transmission unit including transmitters selectively providing the at least one of the first driving signal and the second driving signal to driving channels of the touch sensing array; and
a reception unit including receivers receiving sensing signals from sensing channels of the touch sensing array.

10. The touch controller of claim 1, wherein:
the first display frame period includes a first time period and a subsequent second time period,
the touch sensing array includes row channels and column channels, wherein the row channels are configured to operate as respective driving channels including the at least one driving channel,
during the first time period, the sensing circuit is configured to apply one of the first driving signal and the second driving signal to the row channels, and
during the second time period, the sensing circuit is configured to apply the one of the first driving signal and the second driving signal to the column channels.

11. The touch controller of claim 1, wherein:
each one of the first display frame period and the second display frame period includes a first time period and a subsequent second time period,
the touch sensing array includes row channels and column channels, wherein the row channels are configured to operate as respective driving channels including the at least one driving channel,
during the first time period of the first display frame period, the sensing circuit is configured to apply the first driving signal to a first row channel among the row channels and during the second time period of the first display frame period, the sensing circuit is configured to apply the second driving signal to a second row channel among the row channels, and
during the first time period of the second display frame period, the sensing circuit is configured to apply the second driving signal to the first row channel and during the second time period of the second display frame period, the sensing circuit is configured to apply the first driving signal to the second row channel.

12. The touch controller of claim 1, wherein:
each one of the first display frame period and the second display frame period includes a first time period and a subsequent second time period,
the touch sensing array includes row channels and column channels, wherein the row channels are configured to operate as respective driving channels including the at least one driving channel,
during the first and second time periods of the first display frame period, the sensing circuit is configured to apply the first driving signal to a first row channel among the row channels,
during the first time period of the first display frame period, the sensing circuit is configured to apply the first driving signal to a second row channel among the row channels, and during the second time period of the first display frame period, the sensing circuit is configured to apply the second driving signal to the second row channel,
during the first and second time periods of the second display frame period, the sensing circuit is configured to apply the second driving signal to the first row channel,
during the first time period of the second display frame period, the sensing circuit is configured to apply the second driving signal to the second row channel, and during the second time period of the second display frame period the sensing circuit is configured to apply the first driving signal to the second row channel.

13. The touch controller of claim 1, the sensing circuit applies the first driving signal having the first polarity to plurality of driving channels adjacent to each other of the touch sensing array during a first display frame period and applies the second driving signal having the second polarity to a plurality of driving channels of the touch sensing array during a first display frame period.

14. A touch sensing device comprising:
a touch sensing array stacked on a display panel and including a plurality of electrodes configured to sense a touch input; and
a touch controller configured to generate a polarity-changeable driving signal in response to a display timing signal received from a display driving circuit which drives the display panel and apply the polarity-changeable driving signal to the plurality of electrodes, wherein:
the touch controller drives the touch sensing array to execute each of a first sensing mode and a second sensing mode, which differs from the first sensing mode, during a display frame period, and
each of the first sensing mode and the second sensing mode is a mutual-capacitance sensing mode, a self-capacitance sensing mode, or a touch force sensing mode.

15. The touch sensing device of claim 14, wherein the touch controller changes polarity of the polarity-changeable driving signal from a first polarity to an opposite second polarity in response to a frame change for an image displayed on the display panel.

16. The touch sensing device of claim 14, wherein the touch controller changes polarity of the polarity-changeable driving signal from a first polarity to a second polarity, different from the first polarity, at least twice during each frame of an image displayed on the display panel.

17. A touch sensing method for sensing a touch input applied to a touch sensing array of a touch screen, the touch sensing method comprising:
   using a touch controller to generate a first driving signal having a first polarity and apply the first driving signal to the touch sensing array during a first display frame period synchronously with a timing signal received from a display driving circuit, wherein during the first display frame period, a first frame image is displayed on a display panel of the touch screen; and
   using the touch controller to generate a second driving signal having a second polarity, opposite to the first polarity, and provide the second driving signal to the touch sensing array during a second display frame period synchronously with the timing signal wherein during the second display frame period, a second frame image is displayed on the display panel, wherein:
   the touch controller drives the touch sensing array to execute each of a first sensing mode and a second sensing mode, which differs from the first sensing mode, during the first display frame period, and
   each of the first sensing mode and the second sensing mode is a mutual-capacitance sensing mode, a self-capacitance sensing mode, or a touch force sensing mode.

18. The touch sensing method of claim 17, wherein the first driving signal and the second driving signal are pulse signals having the same frequency.

19. The touch sensing method of claim 17, wherein:
   the second display frame period sequentially follows the first display frame period, and
   the first driving signal is applied to a driving electrode of the touch sensing array during the first display frame period and the second driving signal is applied to the driving electrode during the second display frame period.

20. The touch sensing method of claim 17, wherein the timing signal comprises at least one of a vertical synchronization signal and a horizontal synchronization signal associated with an image displayed on the display panel.

* * * * *